(12) United States Patent
Sakuda et al.

(10) Patent No.: US 9,545,943 B2
(45) Date of Patent: Jan. 17, 2017

(54) STEERING DEVICE

(71) Applicant: JTEKT CORPORATION, Osaka-shi, Osaka (JP)

(72) Inventors: Masayoshi Sakuda, Kashihara (JP); Ryota Okano, Hamamatsu (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/849,198

(22) Filed: Sep. 9, 2015

(65) Prior Publication Data
US 2016/0075367 A1 Mar. 17, 2016

(30) Foreign Application Priority Data

Sep. 17, 2014 (JP) ................................. 2014-189081
Dec. 12, 2014 (JP) ................................. 2014-252422

(51) Int. Cl.
| | | |
|---|---|---|
| *B62D 1/184* | (2006.01) | |
| *B62D 1/185* | (2006.01) | |
| *B62D 1/187* | (2006.01) | |
| *B62D 1/19* | (2006.01) | |

(52) U.S. Cl.
CPC ............... *B62D 1/184* (2013.01); *B62D 1/185* (2013.01); *B62D 1/187* (2013.01); *B62D 1/192* (2013.01)

(58) Field of Classification Search
CPC ......... B62D 1/184; B62D 1/185; B62D 1/187; B62D 1/192
See application file for complete search history.

(56) References Cited

U.S. PATENT DOCUMENTS

| | | | | | |
|---|---|---|---|---|---|
| 4,793,204 | A | * | 12/1988 | Kubasiak | B62D 1/184 280/775 |
| 5,029,489 | A | * | 7/1991 | Burmeister | B62D 1/184 280/775 |
| 5,562,307 | A | * | 10/1996 | Connor | B62D 1/195 188/371 |
| 5,787,759 | A | * | 8/1998 | Olgren | B62D 1/184 280/777 |
| 6,419,269 | B1 | * | 7/2002 | Manwaring | B62D 1/195 280/775 |
| 7,484,430 | B2 | * | 2/2009 | Schulz | B62D 1/184 280/777 |
| 7,685,903 | B2 | * | 3/2010 | Streng | B62D 1/184 74/492 |
| 7,735,868 | B2 | * | 6/2010 | Ridgway | B62D 1/184 280/775 |

(Continued)

FOREIGN PATENT DOCUMENTS

| | | |
|---|---|---|
| JP | 2009-090856 A | 4/2009 |
| JP | 2010-254204 A | 11/2010 |

*Primary Examiner* — Laura Freedman
(74) *Attorney, Agent, or Firm* — Oliff PLC

(57) ABSTRACT

A steering device includes: a rotary shaft supported by an upper bracket; a plurality of engaged teeth fixed to an upper jacket; a lock member including engaging teeth to mesh with the engaged teeth; and a support shaft supported by a lower jacket at a position farther away from the engaged teeth than the rotary shaft 35. When the rotary shaft is rotated, a first rotary member is rotated in synchronization with the rotary shaft. A second rotary member moves the lock member to a disengaged position in conjunction with rotation of the first rotary member. The lock member is urged toward a meshing position by an urging member.

7 Claims, 18 Drawing Sheets

(56) References Cited

U.S. PATENT DOCUMENTS

| | | | |
|---|---|---|---|
| 7,861,615 B2* | 1/2011 | Harris | B62D 1/184 |
| | | | 280/775 |
| 8,047,096 B2* | 11/2011 | Ridgway | B62D 1/184 |
| | | | 280/775 |
| 8,438,944 B2* | 5/2013 | Ridgway | B62D 1/184 |
| | | | 280/775 |
| 9,327,755 B2* | 5/2016 | Yoshihara | B62D 1/184 |
| 2010/0282016 A1* | 11/2010 | Oehri | B62D 1/195 |
| | | | 74/493 |
| 2011/0185839 A1 | 8/2011 | Inoue | |

* cited by examiner

STEERING DEVICE

INCORPORATION BY REFERENCE

The disclosures of Japanese Patent Applications No. 2014-189081 and No. 2014-252422 respectively filed on Sep. 17, 2014 and Dec. 12, 2014, each including the specification, drawings and abstract, are incorporated herein by reference in their entireties.

BACKGROUND OF THE INVENTION

1. Field of the Invention

The present invention relates to a steering device.

2. Description of the Related Art

Japanese Patent Application Publication No. 2009-90856 (JP 2009-90856 A) describes a steering device in which a steering shaft is inserted through a tubular steering column. In the steering column, an upper column and a lower column are assembled telescopically to enable position adjustment of a steering wheel in the axial direction. A clamp portion is mounted to the upper column. The clamp portion is supported by a second vehicle body-side bracket via a first vehicle body-side bracket so as to enable tilt position adjustment. A first through hole and a second through hole are formed in the clamp portion.

A tightening rod is inserted through the first through hole. A rotary shaft is inserted through the second through hole. An operation lever is mounted to one end of the tightening rod. A telescopic holding toothed cam having an eccentric tooth portion is rotatably coupled to the tightening rod. A rotation transfer portion that engages with the telescopic holding toothed cam is non-rotatably coupled to the rotary shaft. The rotary shaft and the operation lever are coupled to each other by a torsion coil spring.

When the operation lever is operated in the clamp direction, rotation of the operation lever is transferred to the rotary shaft via the torsion coil spring to rotate the rotary shaft. Consequently, an abutment piece of the rotation transfer portion contacts the upper side of the telescopic holding toothed cam while being elastically deformed, and thus the telescopic holding toothed cam is rotated so that the eccentric tooth portion of the telescopic holding toothed cam meshes with the outer periphery of the upper column. Consequently, the steering wheel is fixed in position.

Japanese Patent Application Publication No. 2010-254204 (JP 2010-254204 A) describes a steering device that includes an outer column and an inner column inserted through the outer column. A passage hole and a through hole are formed in the outer column. A rod-like member is inserted through the through hole. An adjustment lever is fixed to the base end portion of the rod-like member. An unlock lever is fitted with the rod-like member. A support shaft disposed in parallel with the rod-like member is inserted through the through hole. A telescopic lock eccentric cam is externally fitted with the middle portion of the support shaft. The distal end portion of the unlock lever faces a stepped receiving surface of the telescopic lock eccentric cam. The telescopic lock eccentric cam faces the upper surface of the inner column. When the adjustment lever is turned, the distal end portion of the unlock lever pushes the stepped receiving surface downward to turn the telescopic lock eccentric cam. Consequently, a telescopic lock depression/projection formed on the telescopic lock eccentric cam abuts against the upper surface of the inner column, which fixes the steering wheel in position.

In the steering device according to JP 2009-90856 A, an operation member such as the operation lever and the rotary shaft are coupled to each other by the torsion coil spring. Therefore, the urging force of the torsion coil spring acts on the operation lever, which may increase the operating force required to operate the operation lever. When the operating force is increased, the operability of the operation lever is reduced.

In the steering device according to JP 2010-254204 A, the clearance between the rod-like member and the support shaft must be kept at a predetermined distance in order to cause the distal end portion of the unlock lever, which is fitted with the rod-like member, and the stepped receiving surface of the telescopic lock eccentric cam, which is externally fitted with the support shaft, to face each other. Therefore, it is difficult to reduce the clearance between the rod-like member and the support shaft in the axial direction when the rod-like member and the support shaft are disposed side by side in the axial direction.

When an operation member such as the adjustment lever is disposed at a position away from the upper surface of the inner column, on the other hand, the rigidity of the steering device is reduced. Therefore, in the steering device according to JP 2010-254204 A, it is difficult to reduce the clearance between the rod-like member and the support shaft in the axial direction by disposing the rod-like member, which is provided with the adjustment lever, at a position away from the upper surface of the inner column.

Hence, there is a limitation on the reduction in clearance between the rod-like member and the support shaft in the axial direction of the inner column, which makes it difficult to downsize the steering device.

SUMMARY OF THE INVENTION

It is an object of the present invention to provide a steering device that allows a reduction in operating force for an operation member and that can be downsized.

According to a first aspect of the present invention, a steering device includes: a steering member; a steering shaft which is expandable and contractible in an axial direction and to one end of which the steering member is coupled; a column jacket including an upper jacket adjacent to the steering member and a lower jacket on the opposite side of the upper jacket from the steering member, the column jacket being expandable and contractible in the axial direction together with the steering shaft through movement of the upper jacket with respect to the lower jacket in the axial direction; a bracket fixed to a vehicle body to support the lower jacket; a rotary shaft supported by the bracket to extend in a direction that is orthogonal to the axial direction, the rotary shaft being configured to rotate in accordance with an operation of an operation member attached to one end of the rotary shaft; a plurality of engaged teeth fixed to the upper jacket, the engaged teeth being arranged side by side in the axial direction; a lock member supported by the rotary shaft and having an outer peripheral surface formed with an engaging tooth that meshes with the engaged teeth in order to lock the upper jacket in position in the axial direction, the lock member being relatively rotatable with respect to the rotary shaft between a meshing position at which the engaging tooth and the engaged teeth mesh with each other and a disengaged position at which meshing between the engaging tooth and the engaged teeth is canceled; a support shaft provided separately from the rotary shaft to extend in parallel with the rotary shaft, the support shaft being supported by the lower jacket at a position farther away from the engaged teeth than the rotary shaft; a first rotary member supported by the rotary shaft so as to rotate in synchronization with the rotary shaft; a second rotary member supported by the support shaft and configured to rotate about the support shaft in conjunction with rotation of the first rotary member to abut against the lock member to move the lock member to the disengaged position; and an urging member supported by the second rotary member to urge the lock member toward the meshing position.

In the steering device according to the aspect, the column jacket includes the upper jacket adjacent to the steering member and the lower jacket on the opposite side of the upper jacket from the steering member. The lower jacket is supported by the bracket which is fixed to the vehicle body. Relative movement of the upper jacket with respect to the lower jacket expands and contracts the column jacket together with the steering shaft. Thus, the steering member which is coupled to the steering shaft can be adjusted in position in the axial direction. The rotary shaft which is supported by the bracket supports the lock member and the first rotary member. The support shaft which is provided separately from the rotary shaft is supported by the lower jacket, and supports the second rotary member.

When the lock member is located at the meshing position, the engaging tooth which is formed on the outer peripheral surface of the lock member meshes with the engaged teeth which are fixed to the upper jacket to lock the upper jacket in position in the axial direction of the steering shaft. Consequently, the steering member is locked in position in the axial direction. The lock member is relatively rotatable with respect to the rotary shaft between the meshing position and the disengaged position at which meshing between the engaging tooth and the engaged teeth is canceled.

When the operation member which is attached to one end of the rotary shaft is operated to rotate the rotary shaft, the first rotary member is rotated in synchronization with the rotary shaft, and the second rotary member is rotated about the support shaft in conjunction with rotation of the first rotary member, so that the second rotary member abuts against the lock member. The lock member, against which the second rotary member abuts, is moved to the disengaged position.

The lock member is urged toward the meshing position by the urging member. Therefore, the lock member can be moved from the disengaged position to the meshing position even if the operation member is not operated with a large operating force. On the other hand, although the urging member urges the lock member, the lock member is relatively rotatable with respect to the rotary shaft, and thus the urging force of the urging member does not directly act on the operation member. When the operation member is operated to move the lock member from the disengaged position to the meshing position, such an operation is not significantly affected by the urging force of the urging member. Hence, the operating force for the operation member for moving the lock member between the disengaged position and the meshing position can be reduced.

The support shaft is supported by the lower jacket at a position farther away from the engaged teeth than the rotary shaft, and therefore disposed in a direction inclined in the axial direction of the steering shaft with respect to the rotary shaft. In this case, the clearance between the support shaft and the rotary shaft in the axial direction can be reduced. Hence, the steering device can be downsized in the axial direction of the steering shaft.

From what has been described above, the steering device can be downsized and an operating force for the operation member can be reduced.

According to a second aspect of the present invention, a steering device includes: a steering member; a steering shaft which is expandable and contractible in an axial direction and to one end of which the steering member is coupled; a column jacket including an upper jacket adjacent to the steering member and a lower jacket on the opposite side of the upper jacket from the steering member, the column jacket being expandable and contractible in the axial direction together with the steering shaft through movement of the upper jacket with respect to the lower jacket in the axial direction; a bracket fixed to a vehicle body to support the lower jacket; a rotary shaft supported by the bracket to extend in a direction that is orthogonal to the axial direction, the rotary shaft being configured to rotate in accordance with an operation of an operation member attached to one end (35B) of the rotary shaft; a plurality of engaged teeth fixed to the upper jacket, the engaged teeth being arranged side by side in the axial direction; a lock member supported by the rotary shaft and having an outer peripheral surface formed with an engaging tooth that meshes with the engaged teeth in order to lock the upper jacket in position in the axial direction, the lock member being relatively rotatable with respect to the rotary shaft between a meshing position at which the engaging tooth and the engaged teeth mesh with each other and a disengaged position at which meshing between the engaging tooth and the engaged teeth is canceled; an urging member supported by the lower jacket in engagement with the lock member to urge the lock member toward the meshing position; and a rotary member supported by the rotary shaft so as to rotate in synchronization with the rotary shaft to move the urging member in a direction from the meshing position toward the disengaged position in accordance with rotation of the rotary shaft.

In the steering device according to the aspect described above, the column jacket includes the upper jacket adjacent to the steering member and the lower jacket on the opposite side of the upper jacket from the steering member. The lower jacket is supported by the bracket which is fixed to the vehicle body. Relative movement of the upper jacket with respect to the lower jacket expands and contracts the column jacket together with the steering shaft. Thus, the steering member which is coupled to the steering shaft can be adjusted in position in the axial direction. The rotary shaft, which is supported by the bracket and to one end of which the operation member is attached, supports the lock member and the rotary member.

When the lock member is located at the meshing position, the engaging tooth which is formed on the outer peripheral surface of the lock member meshes with the engaged teeth which are fixed to the upper jacket to lock the upper jacket in position in the axial direction of the steering shaft. Consequently, the steering member is locked in position in the axial direction. The lock member is relatively rotatable with respect to the rotary shaft between the meshing position and the disengaged position at which meshing between the engaging tooth and the engaged teeth is canceled.

The lock member is urged toward the meshing position by the urging member. Therefore, the lock member can be moved from the disengaged position to the meshing position even if the operation member is not operated with a large operating force. The operating force for the operation member for moving the lock member between the disengaged position and the meshing position can be reduced.

The rotary member is rotated in synchronization with the rotary shaft in accordance with rotation of the rotary shaft, which moves the urging member in the direction from the meshing position toward the disengaged position. The urging member is supported by the lower jacket in engagement with the lock member. The rotary member can move the urging member to transfer rotation of the rotary member to the lock member so as to move the lock member from the meshing position to the disengaged position. In this case, it is not necessary to provide a separate component other than the urging member in order to transfer rotation of the rotary member to the lock member. Thus, the number of components can be reduced. In addition, as long as the structure in which the urging member is supported by the lower jacket is adopted, the position and the method for supporting the urging member may be freely selected.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

An embodiment of the present invention will be described in detail below with reference to the accompanying drawings.

Figure 1:
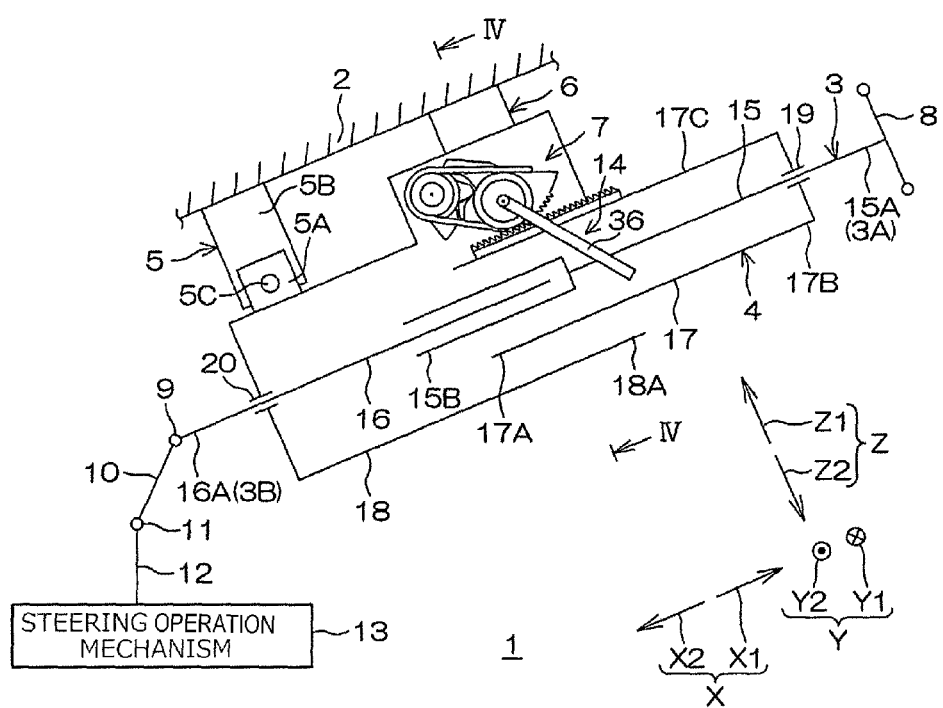
FIG. 1 is a side view illustrating a schematic configuration of a steering device 1 according to an embodiment of the present invention.

In FIG. 1, the left side of the sheet surface corresponds to the front side of a vehicle body 2 to which a steering device 1 is attached. The right side of the sheet surface corresponds to the rear side of the vehicle body 2. The upper side of the sheet surface corresponds to the upper side of the vehicle body 2. The lower side of the sheet surface corresponds to the lower side of the vehicle body 2.

With reference to FIG. 1, the steering device 1 mainly includes a steering shaft 3, a column jacket 4, a lower bracket 5, an upper bracket 6 (bracket), a position adjustment mechanism 14, and a lock mechanism 7.

A steering member 8 is coupled to one end 3A, which is the rear end, of the steering shaft 3. The other end 3B, which is the front end, of the steering shaft 3 is coupled to a pinion shaft 12 of a steering operation mechanism 13 sequentially via a universal joint 9, an intermediate shaft 10, and a universal joint 11. The steering operation mechanism 13 is constituted of a rack-and-pinion mechanism etc. The steering operation mechanism 13 steers steered wheels (not illustrated) in accordance with transfer of rotation of the steering shaft 3.

The steering shaft 3 extends in the front-rear direction of the vehicle body 2. In the following description, the direction in which the steering shaft 3 extends is defined as an axial direction X. The axial direction X is inclined with respect to the horizontal direction such that the other end 3B is lower than the one end 3A. The rear side, which is the steering member 8, in the axial direction X is given a symbol X1. The front side, which is the side opposite side from the steering member 8, in the axial direction X is given a symbol X2.

Among directions that are orthogonal to the axial direction X, the direction which is perpendicular to the sheet surface of FIG. 1 is referred to as a right-left direction Y, and the direction which extends generally vertically in FIG. 1 is referred to as an up-down direction Z. In the right-left direction Y, the far side of the sheet surface of FIG. 1 corresponds to a right side Y1, and the near side of the sheet surface corresponds to a left side Y2. In the up-down direction Z, the upper side is given a symbol Z1, and the lower side is given a symbol Z2.

In the drawings other than FIG. 1, directions corresponding to the axial direction X, the rear side X1, the front side X2, the right-left direction Y, the right side Y1, the left side Y2, the up-down direction Z, the upper side Z1, and the lower side Z2 in FIG. 1 are given the same symbols as FIG. 1.

The steering shaft 3 includes an upper shaft 15 that is at least partially cylindrical and a lower shaft 16 that is columnar. The upper shaft 15 is disposed coaxially on the rear side X1 with respect to the lower shaft 16.

A rear end 15A of the upper shaft 15 corresponds to the one end 3A of the steering shaft 3. The steering member 8 is coupled to the rear end 15A of the upper shaft 15.

A front end 16A of the lower shaft 16 corresponds to the other end 3B of the steering shaft 3. The rear end of the lower shaft 16 is inserted into a front end 15B of the upper shaft 15 from the front side X2. The lower shaft 16 is fitted with the upper shaft 15 through spline fitting or serration fitting to be coupled to the front end 15B of the upper shaft 15. Therefore, the upper shaft 15 and the lower shaft 16 are rotatable together with each other, and relatively movable along the axial direction X. The steering shaft 3 can be expanded and contracted in the axial direction X by movement of the upper shaft 15 with respect to the lower shaft 16 in the axial direction X.

The column jacket 4 is a hollow body that extends in the axial direction X. The column jacket 4 houses the steering shaft 3. The column jacket 4 includes an upper jacket 17 and a lower jacket 18 that extend in the axial direction X.

The upper jacket 17 is positioned on the rear side X1 with respect to the lower jacket 18. The upper jacket 17 is fitted in the lower jacket 18. Particularly, a front end 17A of the upper jacket 17 is inserted into a rear end 18A of the lower jacket 18 from the rear side X1. In this state, the upper jacket 17 is movable in the axial direction X with respect to the lower jacket 18. The entire column jacket 4 can be expanded and contracted along the axial direction X by this movement.

The column jacket 4 is coupled to the steering shaft 3 by a bearing 19 and a bearing 20. Thus, the column jacket 4 rotatably supports the steering shaft 3.

Particularly, a rear end 17B of the upper jacket 17 is coupled to the upper shaft 15 by the bearing 19. The upper jacket 17 rotatably supports the upper shaft 15. The front end of the lower jacket 18 is coupled to the lower shaft 16 by the bearing 20. The lower jacket 18 rotatably supports the lower shaft 16.

Therefore, an assembly of the upper shaft 15 and the upper jacket 17 is movable in the axial direction X with respect to an assembly of the lower shaft 16 and the lower jacket 18. Consequently, the column jacket 4 can be expanded and contracted together with the steering shaft 3.

The expansion and contraction of the steering shaft 3 and the column jacket 4 is referred to as "telescopic operation", and adjustment of the expansion and contraction, that is, adjustment of the position of the steering member 8 in the axial direction X through the telescopic operation is referred to as "telescopic adjustment".

The lower bracket 5 supports a portion of the lower jacket 18 on the front side X2 to couple the steering device 1 to the vehicle body 2.

The lower bracket 5 includes a pair of movable brackets 5A (see FIG. 2) fixed to the lower jacket 18, a fixed bracket 5B fixed to the vehicle body 2, and a center shaft 5C that extends in the right-left direction Y.

The movable brackets 5A are turnably supported by the fixed bracket 5B via the center shaft 5C. Therefore, the entire column jacket 4 can be turned up and down about the center shaft 5C together with the steering shaft 3. The turning is referred to as "tilting", and generally the up-down direction about the center shaft 5C is referred to as a "tilt direction". In addition, adjustment of the direction of the steering member 8 through the tilting is referred to as "tilt adjustment".

The upper bracket 6 supports a portion of the lower jacket 18 on the rear side X1 to couple the steering device 1 to the vehicle body 2.

Figure 2:
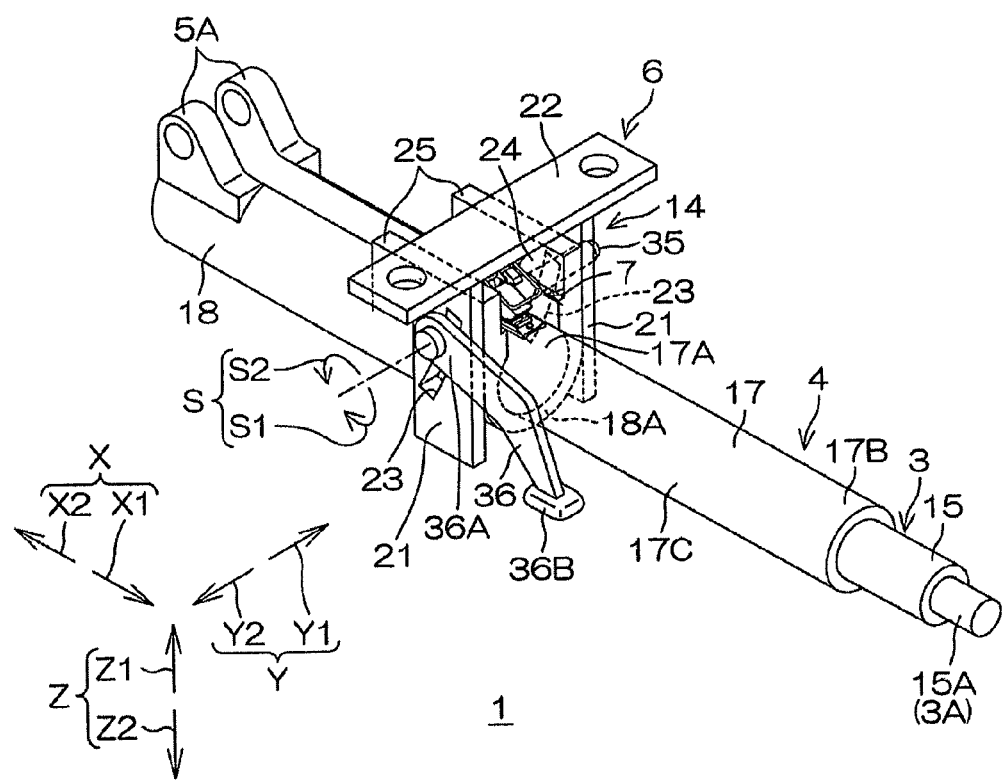
FIG. 2 is a perspective view of the steering device 1.

With reference to FIG. 2, the upper bracket 6 has a groove shape that opens downward, and is formed laterally symmetrically across the column jacket 4 so as to form a generally U shape inverted upside down as seen in the axial direction X. To be specific, the upper bracket 6 integrally includes a pair of side plates 21 and a coupling plate 22. The side plates 21 are thin in the right-left direction Y and face each other across the column jacket 4. The coupling plate 22 is thin in the up-down direction Z and is coupled to the upper end portions of the side plates 21.

A tilt groove 23 is formed in each of the side plates 21. The grooves 23 are formed at the same position as seen in the right-left direction Y. The tilt grooves 23 each extend in the up-down direction Z. To be exact, the tilt grooves 23 each extend in the tilt direction which is a circumferential direction about the center shaft 5C (see FIG. 1). The coupling plate 22 includes portions that extend toward both sides in the right-left direction Y with respect to the side plates 21, for example, and the entire upper bracket 6 is fixed to the vehicle body 2 (see FIG. 1) by bolts or the like (not illustrated) inserted through such portions.

A slit 24 that extends over the entire support portion 25 in the axial direction X to penetrate the lower jacket 18 in the up-down direction Z is formed in a portion of the lower jacket 18 on the upper side Z1. In addition, a pair of support portions 25 is integrally provided at the rear end 18A of the lower jacket 18. The support portions 25 extend toward the upper side Z1 and define the slit 24 from the right-left direction Y. The support portions 25 are each a generally rectangular parallelepiped that extends in the axial direction X and the up-down direction Z.

Figure 3:
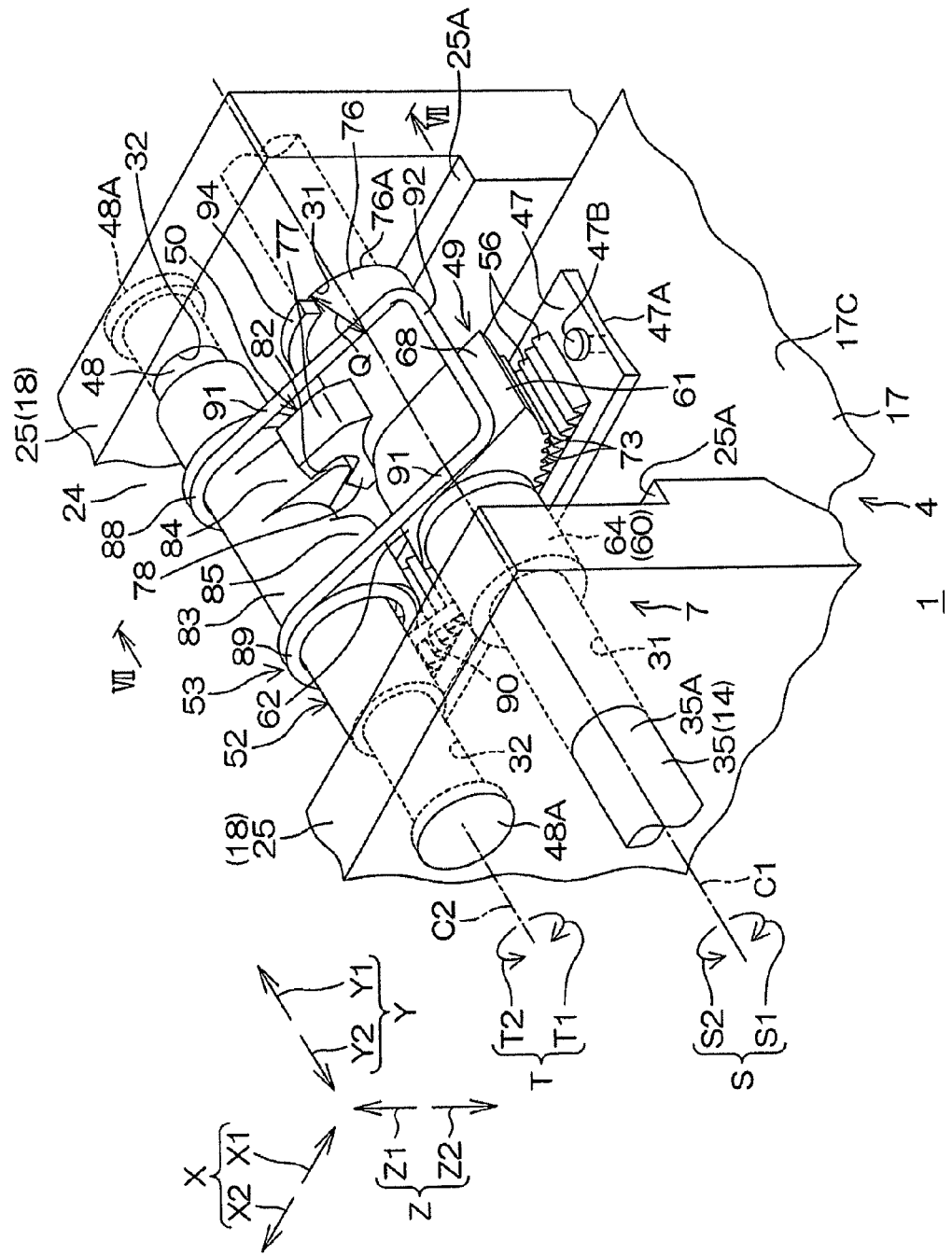
FIG. 3 illustrates a lock mechanism and its surroundings in FIG. 2 as enlarged.

In FIG. 3, for convenience of description, the upper bracket 6 is not illustrated.

With reference to FIG. 3, a step 25A is formed at a portion of the support portion 25 that defines the slit 24. The presence of the steps 25A makes the slit 24 narrower in the right-left direction Y at the middle as the slit 24 extends from the upper end of the lower jacket 18 toward the lower side Z2. A first through hole 31 and a second through hole 32 that penetrate the support portion 25 in the right-left direction Y are formed in each of the support portions 25 at a portion on the upper side Z1 with respect to the step 25A.

The first through holes 31 of the pair of support portions 25 are located at the same position as seen in the right-left direction Y. The second through holes 32 of the pair of support portions 25 are located at the same position as seen in the right-left direction Y. The second through holes 32 are positioned on the front side X2 and the upper side Z1 with respect to the first through holes 31.

Figure 4:
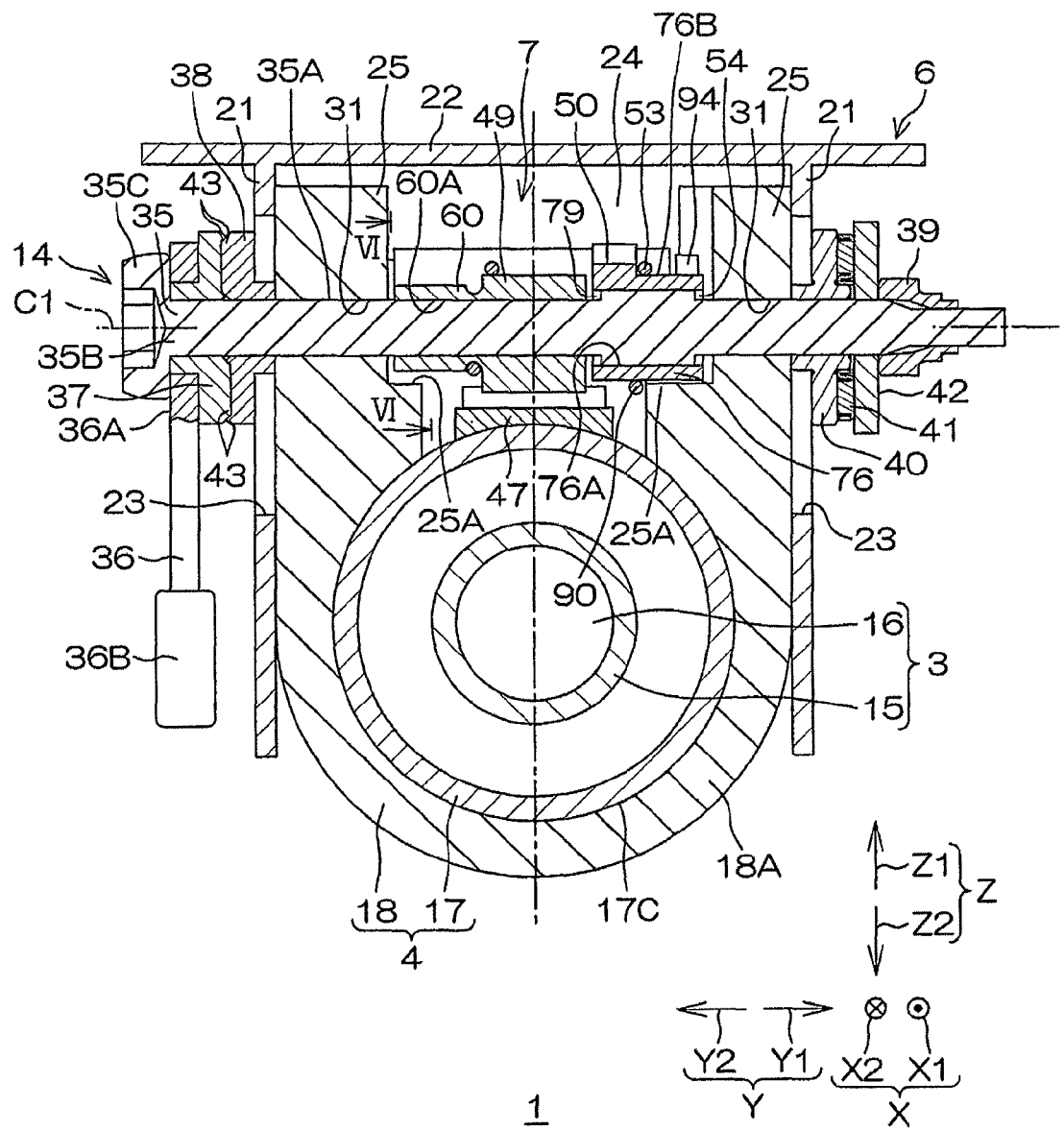
FIG. 4 is a sectional view taken along the line IV-IV of FIG. 1.

With reference to FIG. 4, the first through holes 31 of the pair of support portions 25 overlap a part of the tilt grooves 23 of the pair of side plates 21 of the upper bracket 6.

The position adjustment mechanism 14 is a mechanism that enables tilt adjustment and telescopic adjustment of the steering member 8 (see FIG. 1), and that locks the steering member 8 in position.

The position adjustment mechanism 14 includes a rotary shaft 35, an operation member 36, a ring-shaped cam 37 and a cam follower 38, a nut 39, a ring-shaped interposed member 40, a needle roller bearing 41, and a thrust washer 42.

The rotary shaft 35 is made of metal, and has the shape of a bar that extends in the right-left direction Y. The rotary shaft 35 has a center axis C1 that extends in the right-left direction Y.

The rotary shaft 35 is inserted through a portion at which the first through holes 31 and the tilt grooves 23 overlap each other as seen in the right-left direction Y. The rotary shaft 35 is supported by the pair of side plates 21 of the upper bracket 6. The rotary shaft 35 is positioned on the upper side Z1 with respect to the column jacket 4.

With reference to FIG. 3, the rotary shaft 35 is rotated about the center axis C1. The rotational direction of the rotary shaft 35 is given a symbol S. The rotational direction S is also the circumferential direction of an outer peripheral surface 35A of the rotary shaft 35. In the rotational direction S, the direction in which the rotary shaft 35 is rotated clockwise as seen from the left side Y2 is defined as a clockwise side S1. In the rotational direction S, the direction in which the rotary shaft 35 is rotated counterclockwise as seen from the left side Y2 is defined as a counterclockwise side S2.

With reference to FIG. 4, a left end portion 35B, which is one end, of the rotary shaft 35 is positioned on the left side Y2 with respect to the side plate 21 on the left side Y2. The right end portion, which is the other end, of the rotary shaft 35 is positioned on the right side Y1 with respect to the side plate 21 of the upper bracket 6 on the right side Y1.

A head portion 35C that is larger in diameter than the rotary shaft 35 is provided at the left end portion 35B of the rotary shaft 35. A screw groove is provided at the right end portion of the outer peripheral surface 35A of the rotary shaft 35.

The operation member 36 is a graspable lever, for example. The operation member 36 is attached near the left end portion 35B of the rotary shaft 35. Particularly, a base end portion 36A of the operation member 36 on one end side in the longitudinal direction is fixed to the rotary shaft 35 adjacently on the right side Y1 of the head portion 35C.

When a driver of the vehicle grasps a graspable portion 36B of the operation member 36 on the other end side in the longitudinal direction to operate the operation member 36 toward the clockwise side S1 (toward the pushing side as seen from the driver), the rotary shaft 35 can be rotated toward the clockwise side S1. When the driver grasps the graspable portion 36B to operate the operation member 36 toward the counterclockwise side S2, the rotary shaft 35 can be rotated toward the counterclockwise side S2 (toward the pulling side as seen from the driver). The rotary shaft 35 is rotated in accordance with an operation of the operation member 36.

The left end portion of the rotary shaft 35 is inserted through the cam 37 and the cam follower 38. The cam 37 and the cam follower 38 are arranged in this order from the left side Y2 between the base end portion 36A of the operation member 36 and the side plate 21 on the left side Y2. The rotary shaft 35 is inserted through each of the cam 37 and the cam follower 38.

While the cam 37 is rotatable together with the rotary shaft 35, the cam follower 38 is relatively rotatable and movable in the right-left direction Y with respect to the rotary shaft 35. It should be noted, however, that a portion of the cam follower 38 to be inserted through the tilt groove 23 of the side plate 21 on the left side Y2 is formed to have a width across flat, and thus the tilt groove 23 prevents the cam follower 38 from running idle.

The nut 39 is attached to the screw groove at the right end portion of the rotary shaft 35. The interposed member 40, the needle roller bearing 41, and the thrust washer 42 are arranged in this order from the left side Y2 between the nut 39 and the side plate 21 on the right side. The rotary shaft 35 is inserted through each of the interposed member 40, the needle roller bearing 41, and the thrust washer 42.

The rotary shaft 35 is movable in the tilt direction discussed earlier in the tilt grooves 23 of the upper bracket 6. When the driver moves the steering member 8 in the up-down direction Z for tilt adjustment, the entire column jacket 4 is relatively tilted as discussed earlier with respect to the upper bracket 6. The tilt adjustment of the steering member 8 is performed in the movable range of the rotary shaft 35 in the tilt grooves 23.

When the driver grasps the graspable portion 36B of the operation member 36 to turn the operation member 36 toward the counterclockwise side S2 (see FIG. 2) after performing the telescopic adjustment and the tilt adjustment, the cam 37 is rotated and cam protrusions 43 formed on the cam 37 and the cam follower 38 override each other. Consequently, the cam follower 38 is moved toward the right side Y1 along the axial direction of the rotary shaft 35 to be pressed against the side plate 21 on the left side Y2. When pressed by the cam follower 38, the pair of side plates 21 is tightened from both sides in the right-left direction Y between the cam follower 38 and the interposed member 40.

Consequently, the pair of side plates 21 clamps the support portions 25 of the lower jacket 18 from both sides in the right-left direction Y to generate a friction force between the side plates 21 and the support portions 25. By the friction force, the column jacket 4 is locked in position, and the steering member 8 is locked at the position after the tilt adjustment to be immovable in the tilt direction.

When the pair of support portions 25 of the lower jacket 18 is clamped by the side plates 21, in addition, the clearance between the support portions 25 is narrowed. Consequently, the inner peripheral portion of the lower jacket 18 is narrowed, and the lower jacket 18 is brought into press contact with the upper jacket 17 in the lower jacket 18. As a result, a friction force is generated between the upper jacket 17 and the lower jacket 18.

By the friction between the upper jacket 17 and the lower jacket 18, the upper jacket 17 is locked in position, and the steering member 8 is locked at the position after the telescopic adjustment to be immovable in the axial direction X.

The state of the steering device 1 in which the steering member 8 is fixed in position in the tilt direction and the axial direction X in this way is referred to as a "locked state".

In the steering device 1 in the locked state, when the operation member 36 is turned toward the clockwise side S1, the cam 37 is rotated with respect to the cam follower 38, and the cam follower 38 is moved toward the left side Y2 along the axial direction of the rotary shaft 35. The pair of side plates 21 is then untightened between the cam follower 38 and the interposed member 40. Therefore, the friction force between the side plates 21 and the support portions 25 and the friction force between the lower jacket 18 and the upper jacket 17 are eliminated, which allows the steering member 8 to be moved in the axial direction X and the tilt direction. Telescopic adjustment and tilt adjustment can be performed on the steering member 8 again.

The state of the steering device 1 in which the steering member 8 is not fixed in position in the tilt direction and the axial direction X is referred to as an "unlocked state".

Next, the lock mechanism 7 will be described in detail.

The lock mechanism 7 is a mechanism that fixes the upper jacket 17 and the lower jacket 18 in position in the axial direction X through a lock due to meshing between teeth (positive lock).

Figure 5:
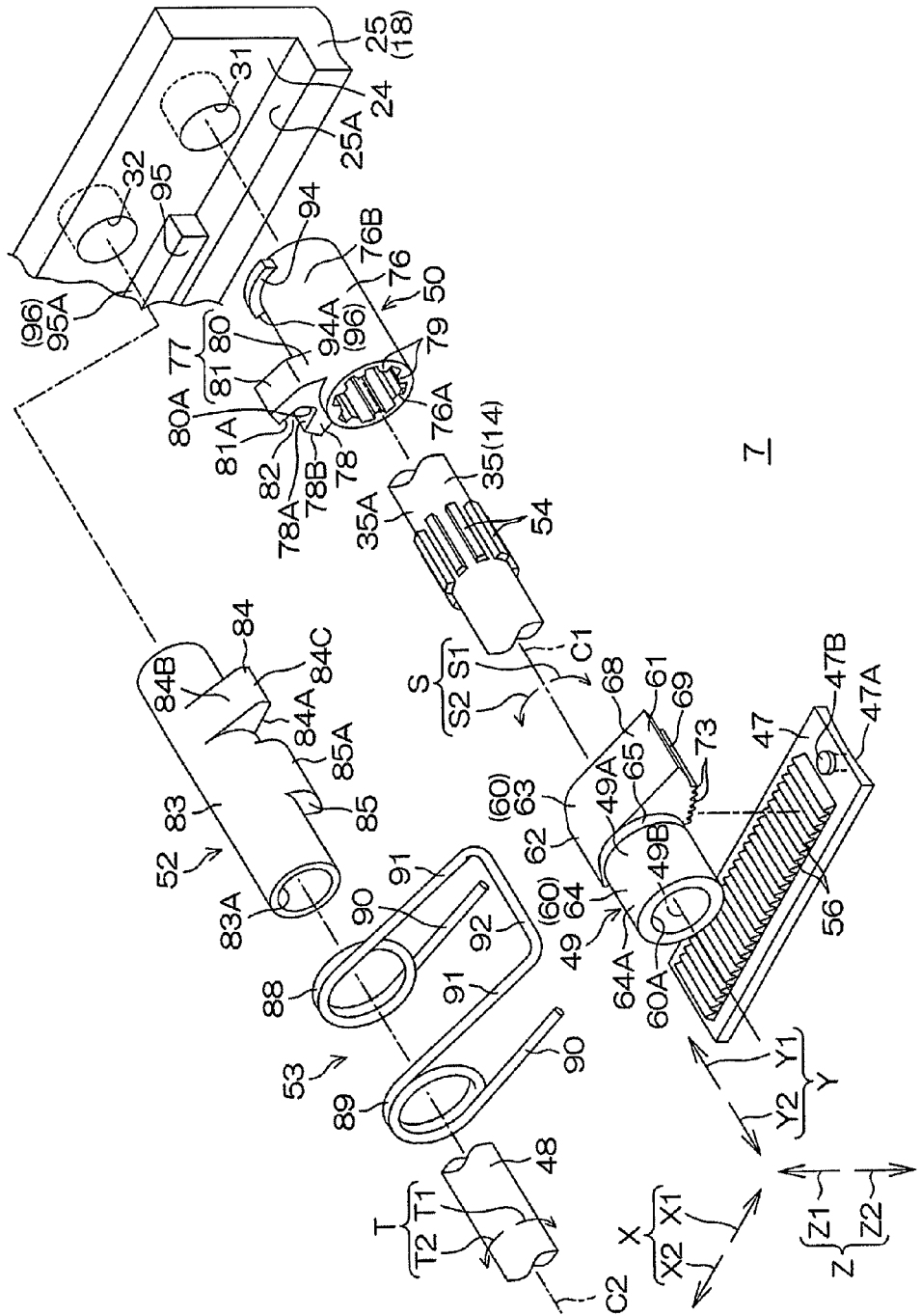
FIG. 5 is an exploded perspective view of the lock mechanism of the steering device 1.

With reference to FIG. 5, the lock mechanism 7 includes a lock plate 47, a support shaft 48, a lock member 49, a first rotary member 50, a second rotary member 52, and an urging member 53.

The lock plate 47 has the shape of a plate that is long in the axial direction X and that is thin in the up-down direction Z. Particularly, a lower surface 47A of the lock plate 47 is concavely curved toward the upper side Z1 along an outer peripheral surface 17C of the upper jacket 17 (see FIG. 3). The lock plate 47 is disposed in the slit 24 of the lower jacket 18. The lock plate 47 is provided with a plurality of generally triangular engaged teeth 56 projecting toward the upper side Z1. The engaged teeth 56 project obliquely toward the front side X2 as the engaged teeth 56 extend toward the upper side Z1 as seen in the right-left direction Y. The engaged teeth 56 extend in the right-left direction Y, and are arranged adjacent to each other in the axial direction X.

With reference to FIG. 3, a pin 47B made of a resin, for example, is inserted through the rear end of the lock plate 47 and a portion of the upper jacket 17 on the upper side Z1. The lock plate 47 is fixed to the upper jacket 17 by the pin 47B. A part of the lock plate 47 overlaps a part of the rotary shaft 35 as seen in the up-down direction Z.

The support shaft 48 is provided separately from the rotary shaft 35, and has the shape of a bar that extends in parallel with the rotary shaft 35, that is, in the right-left direction Y. The support shaft 48 has a center axis C2 that extends in the right-left direction Y. The outside diameter of the support shaft 48 is smaller than the outside diameter of the rotary shaft 35. The circumferential direction of the support shaft 48 is given a symbol T. In the circumferential direction T, the direction in which the support shaft 48 is rotated clockwise as seen from the left side Y2 is defined as a clockwise side T1. In the circumferential direction T, the direction in which the support shaft 48 is rotated counterclockwise as seen from the left side Y2 is defined as a counterclockwise side T2.

A flange portion 48A that expands outward in the radial direction of the support shaft 48 is provided at both end portions of the support shaft 48 in the right-left direction Y, one flange portion 48A at each end portion.

The support shaft 48 is inserted as press-fitted in the second through holes 32 of the support portions 25 of the lower jacket 18, and therefore not rotatable. In this state, the flange portion 48A on the right side Y1 is in contact with the support portion 25 on the right side Y1 from the right side Y1, and the flange portion 48A on the left side Y2 is in contact with the support portion 25 on the left side Y2 from the left side Y2, which restricts movement of the support shaft 48 in the right-left direction Y.

As discussed earlier, the second through holes 32 are positioned on the front side X2 and the upper side Z1 with respect to the first through holes 31 of the support portions 25. Therefore, the support shaft 48 is supported by the pair of support portions 25 of the lower jacket 18 at a position farther away from the plurality of engaged teeth 56 of the lock plate 47 toward the upper side Z1 than the rotary shaft 35, and therefore disposed in a direction inclined in the axial direction X with respect to the rotary shaft 35.

As discussed earlier, the operation member 36 is attached to the rotary shaft 35 (see FIG. 4). Consequently, the operation member 36 can be disposed close to the upper jacket 17 irrespective of the position of the support shaft 48, which does not reduce the rigidity of the steering device 1. In other words, the arrangement of the support shaft 48 can be determined without reducing the rigidity of the steering device 1. Therefore, there is a high degree of freedom in arrangement of the support shaft 48.

With reference to FIG. 5, the lock member 49 integrally includes a cylindrical portion 60, a first projecting portion 61, and a second projecting portion 62. The cylindrical portion 60 extends in the right-left direction Y.

The cylindrical portion 60 includes a first portion 63 on the right side Y1, and a second portion 64 that extends toward the left side Y2 continuously from the first portion 63. An outer peripheral surface 64A of the second portion 64 has a circular shape as seen in the right-left direction Y. The cylindrical portion 60 has an insertion hole 60A that has a circular shape and that penetrates the cylindrical portion 60 in the right-left direction Y.

A groove 65 dented generally semi-arcuately and inward in the radial direction of the cylindrical portion 60 is formed at the boundary between the first portion 63 of the cylindrical portion 60 and the second portion 64 of the cylindrical portion 60 to extend over the entire circumference in the rotational direction S. The cylindrical portion 60 is disposed coaxially with the rotary shaft 35. The circumferential direction of the cylindrical portion 60 coincides with the rotational direction S.

Figure 6:
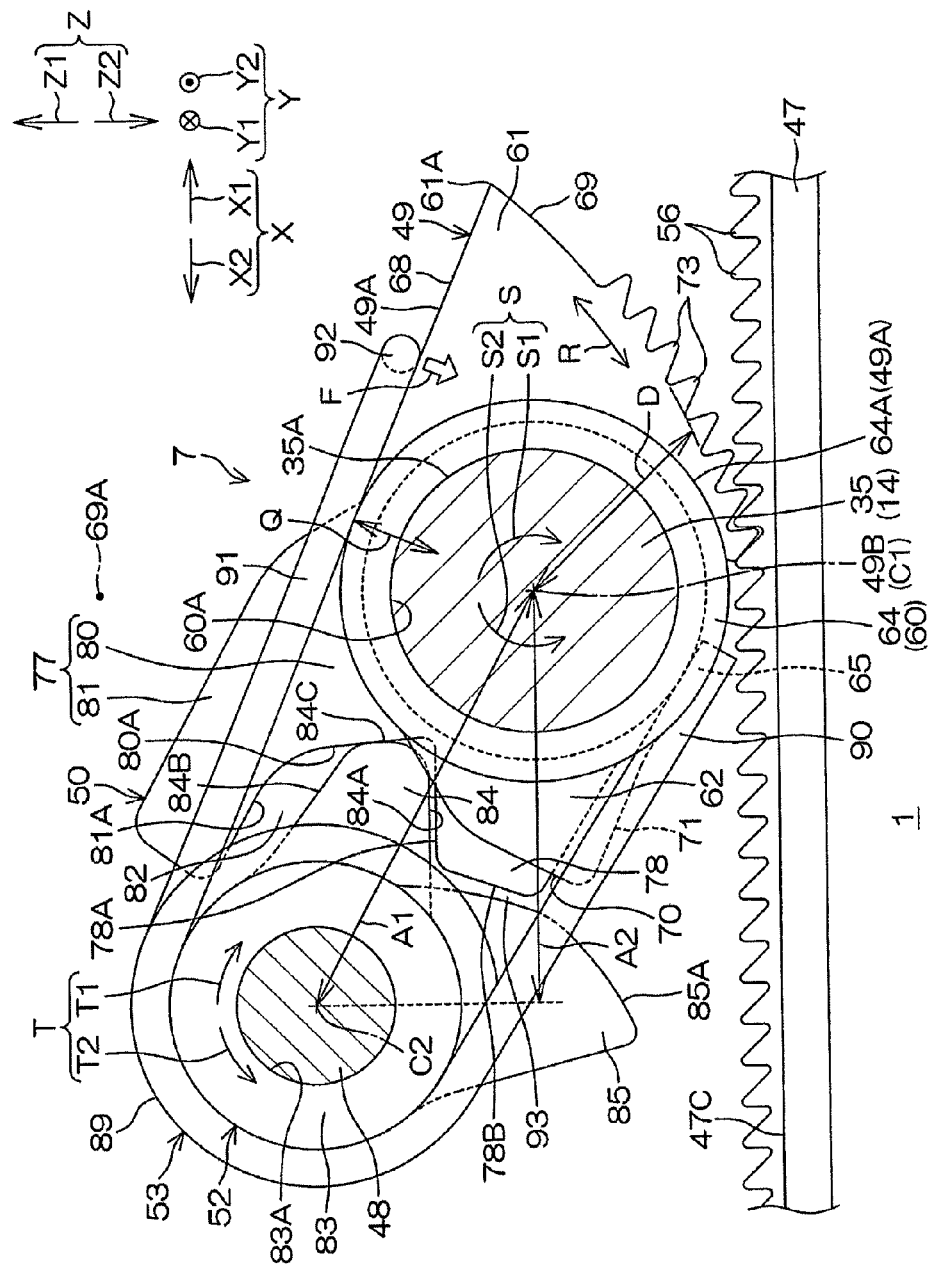
FIG. 6 is a sectional view taken along the line VI-VI of FIG. 4.

With reference to FIG. 6, the first projecting portion 61 projects from the first portion 63 of the cylindrical portion 60 toward the rear side X1, and has a generally triangular shape as seen in the right-left direction Y. The first projecting portion 61 has a flat surface 68 on the upper side Z1 and a curved surface 69 on the lower side Z2. The flat surface 68 is a surface of the first projecting portion 61 on the counterclockwise side S2. The curved surface 69 is a surface of the first projecting portion 61 on the clockwise side S1.

The flat surface 68 is a flat surface that extends along the direction of a tangent to the outer peripheral surface 64A of the second portion 64 of the cylindrical portion 60. The curved surface 69 is convexly curved toward the lower side Z2. The radius of curvature of the curved surface 69 is larger than the radius of curvature of the outer peripheral surface 64A of the second portion 64 of the cylindrical portion 60. The flat surface 68 and the curved surface 69 are a part of an outer peripheral surface 49A of the lock member 49. A vertex at which the rear end portion of the flat surface 68 and the rear end portion of the curved surface 69 are coupled to each other is given a symbol 61A.

The second projecting portion 62 projects from the first portion 63 of the cylindrical portion 60 toward the front side X2, and has a generally triangular shape as seen in the right-left direction Y. The second projecting portion 62 has a curved surface 70 on the upper side Z1 and a flat surface 71 on the lower side Z2. The curved surface 70 is a surface of the second projecting portion 62 on the clockwise side S1. The flat surface 71 is a surface of the second projecting portion 62 on the counterclockwise side S2.

The curved surface 70 is convexly curved toward the front side X2 and the upper side Z1. The respective front end portions of the curved surface 70 and the flat surface 71 of the second projecting portion 62 are smoothly coupled to each other. The curved surface 70 is a part of the outer peripheral surface 49A of the lock member 49.

The first projecting portion 61 and the second projecting portion 62 coincide with each other in position in the right-left direction Y. The whole shape of the first portion 63 of the cylindrical portion 60, the first projecting portion 61, and the second projecting portion 62 is a generally diamond shape as seen in the right-left direction Y.

With reference to FIG. 4, the lock member 49 is disposed in the slit 24 of the lower jacket 18. A portion of the rotary shaft 35 that is positioned in the slit 24 is inserted into the insertion hole 60A of the cylindrical portion 60 of the lock member 49.

With reference to FIG. 6, the lock member 49 is supported by the rotary shaft 35. The lock member 49 is relatively rotatable in the rotational direction S with respect to the rotary shaft 35. A center of rotation 49B of the lock member 49 coincides with the center axis C1 of the rotary shaft 35 as seen in the right-left direction Y. The lock member 49 is disposed on the upper side Z1 of the lock plate 47. In this state, the second projecting portion 62 of the lock member 49 is directed toward the support shaft 48 on the front side X2.

The position of a center of curvature 69A of the curved surface 69 of the lock member 49 in the axial direction X substantially coincides with the position of the center of rotation 49B of the lock member 49 in the axial direction X. The center of curvature 69A is located on the upper side Z1 with respect to the center of rotation 49B. That is, the center of curvature 69A is located at a position offset from the center of rotation 49B toward the upper side Z1. As discussed earlier, the radius of curvature of the curved surface 69 of the lock member 49 is larger than the radius of curvature of the outer peripheral surface 64A of the second portion 64 of the cylindrical portion 60 of the lock member 49. Therefore, a distance D from the center of rotation 49B to the curved surface 69 increases toward the rear side X1.

The curved surface 69 of the lock member 49 is provided with a plurality of engaging teeth 73. The engaging teeth 73 are generally triangular as seen in the right-left direction Y and project as inclined toward the vertex 61A of the first projecting portion 61 with respect to the radial direction of the curved surface 69. The engaging teeth 73 extend in the right-left direction Y. The engaging teeth 73 are arranged adjacent to each other along a surface direction R of the curved surface 69 as seen in the right-left direction Y. The engaging teeth 73 (curved surface 69) are provided so as to engage with the engaged teeth 56 of the lock plate 47 on the rear side X1 with respect to the center of rotation 49B of the lock member 49.

As discussed earlier, the lock member 49 is positioned on the upper side Z1 of the lock plate 47. The surface direction R of the curved surface 69 is provided farther away from the lock plate 47 toward the rear side X1. Therefore, the distance D from the center of rotation 49B to the curved surface 69 increases at a location farther away from the engaged teeth 56.

With reference to FIG. 5, the first rotary member 50 integrally includes a cylindrical portion 76, a first protrusion 77 and a second protrusion 78 disposed away from each other in the rotational direction S, and a positioning portion 94.

The cylindrical portion 76 extends in the right-left direction Y. The cylindrical portion 76 is disposed coaxially with the rotary shaft 35. The cylindrical portion 76 has an insertion hole 76A that penetrates the cylindrical portion 76 in the right-left direction Y, and an outer peripheral surface 76B that is a cylindrical surface that extends along the rotational direction S of the rotary shaft 35. Internal splines 79 that extend in the right-left direction Y are formed on the inner peripheral surface of the cylindrical portion 76 over the entire inner peripheral surface in the circumferential direction.

With reference to FIG. 6, the first protrusion 77 extends from a portion of the cylindrical portion 76 on the left side Y2 toward the upper side Z1 and the front side X2. Particularly, the first protrusion 77 includes a base end portion 80 that extends from the cylindrical portion 76 toward the upper side Z1, and a distal end portion 81 that extends from the upper end portion of the base end portion 80 to be bent toward the front side X2. The direction in which the base end portion 80 extends also corresponds to the radially outer side of the cylindrical portion 76. The direction in which the distal end portion 81 extends also corresponds to the counterclockwise side S2 with reference to the base end portion 80.

A surface of the base end portion 80 on the front side X2 is given a symbol 80A. A surface of the distal end portion 81 on the front side X2 and the lower side Z2 is given a symbol 81A. The surface 80A and the surface 81A are smoothly coupled to each other by a surface that is concavely curved toward the rear side X1. The surface 80A is a surface of the base end portion 80 on the counterclockwise side S2. The surface 81A is a surface of the distal end portion 81 on the counterclockwise side S2.

The second protrusion 78 projects from a portion of the cylindrical portion 76 on the left side Y2 toward the front side X2. The second protrusion 78 has a generally isosceles trapezoidal shape that becomes thinner toward the front side X2 as seen in the right-left direction Y. The direction in which the second protrusion 78 projects also corresponds to the radially outer side of the cylindrical portion 76.

As seen in the right-left direction Y, a surface 78A of the second protrusion 78 on the upper side Z1 that forms a leg of the generally isosceles trapezoidal shape and a surface 78B of the second protrusion 78 that forms the upper base of the generally isosceles trapezoidal shape are smoothly coupled to each other. The surface 78A is a surface of the second protrusion 78 on the clockwise side S1.

The second protrusion 78 is positioned on the lower side Z2 with respect to the first protrusion 77. The first protrusion 77 and the second protrusion 78 coincide with each other in position in the right-left direction Y.

A dent 82 is provided between the first protrusion 77 and the second protrusion 78. The dent 82 is defined between the surface 80A and the surface 81A of the first protrusion 77 and the surface 78A of the second protrusion 78 in the up-down direction Z (rotational direction S).

Figure 7:
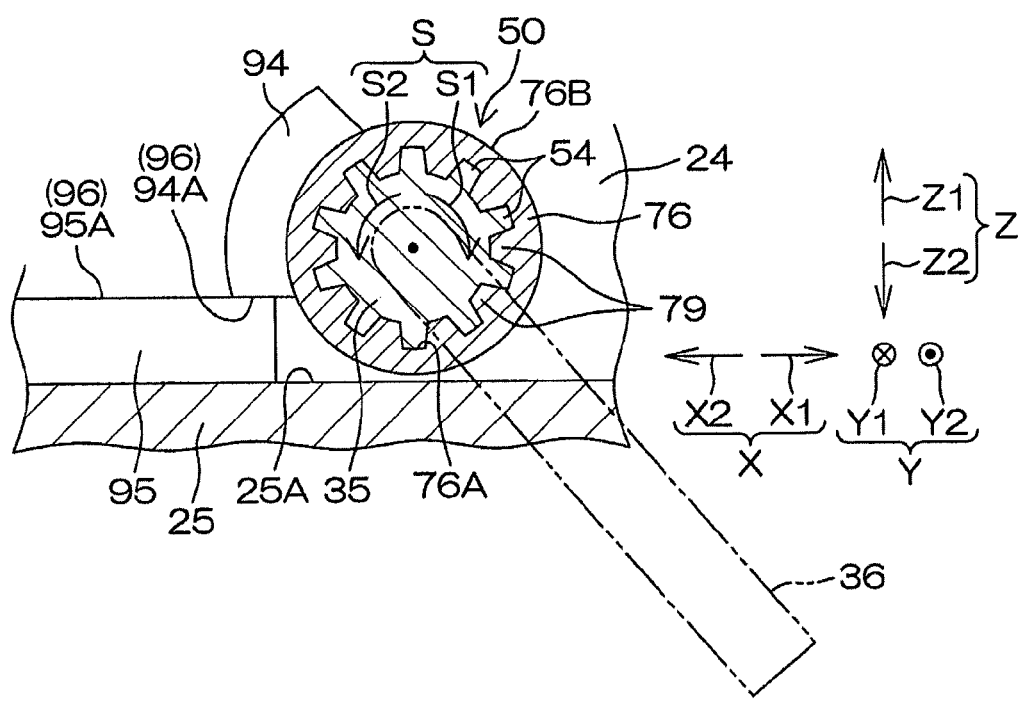
FIG. 7 is a sectional view taken along the line VII-VII of FIG. 3.

In FIG. 7, for convenience of description, the operation member 36 is illustrated by the long dashed double-short dashed line although not actually present.

With reference to FIG. 7, the positioning portion 94 projects from the right end portion of the cylindrical portion 76 toward the upper side Z1 and the front side X2, and extends in the rotational direction S. The positioning portion 94 is generally fan-shaped as seen from the right side Y1. The positioning portion 94 includes a positioning surface 94A. The first positioning surface 94A is an end surface of the positioning portion 94 on the counterclockwise side S2. The first positioning surface 94A is a flat surface that is orthogonal to the rotational direction S.

With reference to FIG. 4, the first rotary member 50 is disposed on the right side Y1 with respect to the lock member 49 in the slit 24 of the lower jacket 18. A portion of the rotary shaft 35 that is positioned in the slit 24 is inserted through the insertion hole 76A of the cylindrical portion 76 of the first rotary member 50. External splines 54 that extend in the right-left direction Y are formed on a portion of the outer peripheral surface 35A of the rotary shaft 35 that is inserted through the insertion hole 76A over the entire outer peripheral surface 35A in the circumferential direction. In this state, the external splines 54 of the rotary shaft 35 and the internal splines 79 of the first rotary member 50 are spline-fitted with each other. Therefore, the first rotary member 50 is supported by the rotary shaft 35 so as to rotate in synchronization with the rotary shaft 35 in the rotational direction S. In this state, the second protrusion 78 of the first rotary member 50 is directed toward the support shaft 48 (see FIG. 6).

With reference to FIG. 5, in association with the positioning portion 94 of the first rotary member 50, the support portion 25 on the right side Y1 is provided with a generally rectangular stepped portion 95 that projects from the step 25A of the support portion 25 on the right side Y1 toward the upper side Z1 and that extends in the axial direction X. A surface of the stepped portion 95 on the upper side Z1 is referred to as a "second positioning surface 95A". The second positioning surface 95A is orthogonal to the up-down direction Z.

With reference to FIG. 7, the first positioning surface 94A of the first rotary member 50 and the second positioning surface 95A of the stepped portion 95 face each other in the up-down direction Z. When the steering device 1 is in the locked state, the first positioning surface 94A is in abutment with the second positioning surface 95A from the upper side Z1.

When the operation member 36 is turned toward the clockwise side S1 in order to bring the steering device 1 from the locked state to the unlocked state, the first rotary member 50 is moved toward the clockwise side S1 in accordance with an operation of the operation member 36. Even if it is attempted to turn the operation member 36 from the locked state toward the counterclockwise side S2, on the other hand, the operation member 36 cannot be turned because the first positioning surface 94A and the second positioning surface 95A are in abutment with each other. Consequently, the turn of the operation member 36 can be restricted to a necessary range.

With reference to FIG. 5, the second rotary member 52 integrally includes a cylindrical portion 83, and a first projection 84 and a second projection 85 disposed away from each other in the right-left direction Y which is the direction in which the support shaft 48 extends.

The cylindrical portion 83 extends in the right-left direction Y. The cylindrical portion 83 has an insertion hole 83A that has a circular shape and that penetrates the cylindrical portion 83 in the right-left direction Y.

With reference to FIG. 6, the first projection 84 projects toward the rear side X1 from a portion of the cylindrical portion 83 that is on the right side Y1 with respect to generally the center in the right-left direction Y. The first projection 84 has a generally isosceles trapezoidal shape that becomes thinner toward the rear side X1 as seen in the right-left direction Y. The direction in which the first projection 84 projects also corresponds to the radially outer side of the cylindrical portion 83.

A surface of the first projection 84 on the lower side Z2 that forms a leg of the generally isosceles trapezoidal shape as seen in the right-left direction Y is given a symbol 84A. A surface of the first projection 84 on the upper side Z1 that forms a leg of the generally isosceles trapezoidal shape is given a symbol 84B. A surface of the first projection 84 that forms the upper base of the generally isosceles trapezoidal shape is given a symbol 84C. The surface 84A, the surface 84B, and the surface 84C are smoothly coupled to each other by a curved surface. The surface 84A is a surface of the first projection 84 on the clockwise side T1. The surface 84B is a surface of the first projection 84 on the counterclockwise side T2.

The second projection 85 projects toward the rear side X1 and the lower side Z2 from a portion of the cylindrical portion 83 that is on the left side Y2 with respect to generally the center in the right-left direction Y (see FIG. 3). The second projection 85 has a generally triangular shape as seen in the right-left direction Y. The direction in which the second projection 85 projects also corresponds to the radially outer side of the cylindrical portion 83.

The second projection 85 has a flat surface on the front side X2 and a curved surface 85A on the rear side X1. The curved surface 85A is convexly curved toward the rear side X1. The lower end portion of the flat surface and the lower end surface of the curved surface 85A are smoothly coupled to each other. The curved surface 85A is a surface of the cylindrical portion 83 on the counterclockwise side T2.

The second rotary member 52 is disposed in the slit 24 on the front side X2 with respect to the lock member 49 and the first rotary member 50 (see FIG. 3). A portion of the support shaft 48 that is positioned in the slit 24 is inserted through the insertion hole 83A of the cylindrical portion 83 of the second rotary member 52. The second rotary member 52 is supported by the support shaft 48 so as to be relatively rotatable in the circumferential direction T of the support shaft 48 with respect to the support shaft 48. The second rotary member 52 is rotatable about the center axis C2 of the support shaft 48, that is, about the support shaft 48. In this state, the first projection 84 and the second projection 85 of the second rotary member 52 are directed toward the rotary shaft 35.

The position of the first projection 84 of the second rotary member 52 in the right-left direction Y coincides with the position of the first protrusion 77 and the second protrusion 78 of the first rotary member 50 in the right-left direction Y (see FIG. 3).

The first projection 84 of the second rotary member 52 is positioned in the dent 82 of the first rotary member 50. The surface 84A of the first projection 84 on the lower side Z2 and the surface 78A of the second protrusion 78 of the first rotary member 50 on the upper side Z1 face each other in the up-down direction Z. The surface 84B of the first projection 84 on the upper side Z1 and the surface 80A and the surface 81A of the first protrusion 77 on the lower side Z2 face each other in the up-down direction Z.

The position of the second projection 85 in the right-left direction Y coincides with the position of the first projecting portion 61 and the second projecting portion 62 of the lock member 49 in the right-left direction Y (see FIG. 3). The curved surface 85A of the second projection 85 of the second rotary member 52 and the curved surface 70 of the second projecting portion 62 of the lock member 49 face each other in the axial direction X.

The support shaft 48 may be rotatably supported by the support portions 25 of the lower jacket 18, and the second rotary member 52 may be rotatable together with the support shaft 48. In this case as well, the second rotary member 52 is rotated about the support shaft 48.

With reference to FIG. 5, the urging member 53 is a spring formed by bending a single wire. The urging member 53 integrally includes a first coil-shaped portion 88, a second coil-shaped portion 89, a pair of holding portions 90, a pair of deformable portions 91, and a coupling portion 92.

The first coil-shaped portion 88 and the second coil-shaped portion 89 are spirally shaped along the right-left direction Y. The first coil-shaped portion 88 and the second coil-shaped portion 89 are disposed coaxially with a clearance therebetween in the right-left direction Y. The first coil-shaped portion 88 is disposed on the right side Y1 with respect to the second coil-shaped portion 89.

The holding portion 90 and the deformable portion 91 on the left side Y2 extend from the second coil-shaped portion 89 toward the rear side X1 and the lower side Z2. The holding portion 90 and the deformable portion 91 on the right side Y1 extend from the first coil-shaped portion 88 toward the rear side X1 and the lower side Z2. The coupling portion 92 couples between the respective rear end portions of the deformable portions 91.

With reference to FIG. 3, the urging member 53 is supported by the second rotary member 52 with the pair of holding portions 90 and the pair of deformable portions 91 directed toward the rotary shaft 35. The first coil-shaped portion 88 of the urging member 53 is loosely wound around the cylindrical portion 83 of the second rotary member 52 on the right side Y1 with respect to the first projection 84 of the second rotary member 52. The second coil-shaped portion 89 of the urging member 53 is loosely wound around the cylindrical portion 83 on the left side Y2 with respect to the second projection 85 of the second rotary member 52.

Consequently, the entire urging member 53 can be prevented from rotating together with the second rotary member 52.

With reference to FIG. 6, the urging member 53 clamps the lock member 49 and the first rotary member 50 in the up-down direction Z between the pair of holding portions 90 and the pair of deformable portions 91 and the coupling portion 92. Particularly, the rear end portion of the holding portion 90 of the urging member 53 on the left side Y2 is fitted into the groove 65 of the lock member 49 from the lower side Z2. The rear end portion of the holding portion 90 on the left side Y2 is in contact with a portion of the outer peripheral surface of the cylindrical portion 60 of the lock member 49 that defines the groove 65 from the lower side Z2. The rear end portion of the holding portion 90 on the right side Y1 is in contact with the outer peripheral surface 76B of the cylindrical portion 76 of the first rotary member 50 from the lower side Z2 (see FIG. 4).

With reference to FIG. 3, the deformable portion 91 on the left side Y2 and a portion of the coupling portion 92 on the left side Y2 are in contact with the flat surface 68 of the first projecting portion 61 of the lock member 49 form the upper side Z1. The deformable portion 91 on the right side Y1 is in contact with the outer peripheral surface 76B of the cylindrical portion 76 of the first rotary member 50 from a direction Q of a normal to the outer peripheral surface 76B.

With reference to FIG. 6, when the urging member 53 is assembled to the lock mechanism 7 as in FIG. 6, the pair of deformable portions 91 of the urging member 53 is elastically deformed toward the upper side Z1. Therefore, a force that urges the pair of deformable portions 91 in the up-down direction Z toward the lower side Z2, or toward the pair of holding portions 90, is generated in the urging member 53 at all times, and the force serves as an urging force F that urges the entire lock member 49 toward the clockwise side S1.

When the steering device 1 is in the locked state discussed earlier, at least the engaging tooth 73 of the lock member 49 on the foremost side X2 meshes with the plurality of engaged teeth 56 of the lock plate 47 as illustrated in FIG. 6. The position of the lock member 49 in the rotational direction S at this time is referred to as a "meshing position".

When the lock member 49 is located at the meshing position in the locked state, a gap 93 in the axial direction X is provided between the curved surface 85A of the second projection 85 and the curved surface 70 of the second projecting portion 62 of the lock member 49.

The lock member 49 is urged toward the meshing position by the urging force F when the lock member 49 is located at the meshing position. Therefore, the lock member 49 is maintained at the meshing position.

As discussed earlier, the lock plate 47 is fixed to the upper jacket 17, and the lock member 49 is fixed to the lower jacket 18 via the rotary shaft 35.

Therefore, when the lock member 49 is located at the meshing position, relative movement of the upper jacket 17 with respect to the lower jacket 18 is restricted. The upper jacket 17 is further strongly locked in position in the axial direction X.

That is, in addition to the friction force between the lower jacket 18 and the upper jacket 17, the plurality of engaging teeth 73 of the lock member 49 on the lower jacket 18 side meshes with the plurality of engaged teeth 56 of the lock plate 47 on the upper jacket 17 side. Consequently, the upper jacket 17 can be strongly locked in position in the axial direction X.

As discussed earlier, the outside diameter of the rotary shaft 35 is larger than the outside diameter of the support shaft 48. Therefore, the strength of meshing between the plurality of engaging teeth 73 of the lock member 49 which is supported by the rotary shaft 35 and the plurality of engaged teeth 56 of the lock plate 47 is improved.

If an operating position of the operation member 36 at the time when the lock member 49 is moved to the meshing position is fluctuated, the relative position in the rotational direction S between the operation member 36 and the rotary shaft 35, that is, the lever operation angle, may be fluctuated. In the locked state, however, the lock member 49 is inevitably positioned at the meshing position irrespective of the lever operation angle of the operation member 36. In the case where the lever operation angle is fluctuated, such fluctuations vary the size of the gap 93 between the second rotary member 52 and the lock member 49, but do not vary the position of the lock member 49. That is, the gap 93 absorbs the fluctuations.

Operation of the lock mechanism 7 at the time when the operation member 36 is rotated toward the clockwise side S1 from the locked state will be described in detail (see FIG. 2).

In the steering device 1 in the locked state, when the operation member 36 (see FIG. 2) is rotated toward the clockwise side S1, the rotary shaft 35 is rotated toward the clockwise side S1. At this time, the first rotary member 50 which is rotatable in synchronization with the rotary shaft 35 is also rotated toward the clockwise side S1. Hence, the second protrusion 78 of the first rotary member 50 is moved toward the upper side Z1.

As discussed earlier, the surface 78A of the second protrusion 78 of the first rotary member 50 and the surface 84A of the first projection 84 of the second rotary member 52 face each other in the up-down direction Z. The surface 78A abuts against the surface 84A along with rotation of the rotary shaft 35. The second protrusion 78 moves the first projection 84 toward the upper side Z1 with the surface 78A abutting against the surface 84A. The second rotary member 52 is relatively rotatable with respect to the support shaft 48. Thus, the second rotary member 52, the first projection 84 of which has been pressed toward the upper side Z1 by the second protrusion 78, is rotated toward the counterclockwise side T2 about the support shaft 48. When the operation member 36 (see FIG. 2) is operated to rotate the rotary shaft 35 toward the clockwise side S1 in this way, the second rotary member 52 is rotated toward the counterclockwise side T2 in the circumferential direction T about the support shaft 48 in conjunction with rotation of the first rotary member 50 toward the clockwise side S1. When the second rotary member 52 is rotated toward the counterclockwise side T2, the second projection 85 of the second rotary member 52 is moved toward the rear side X1.

Figure 8:
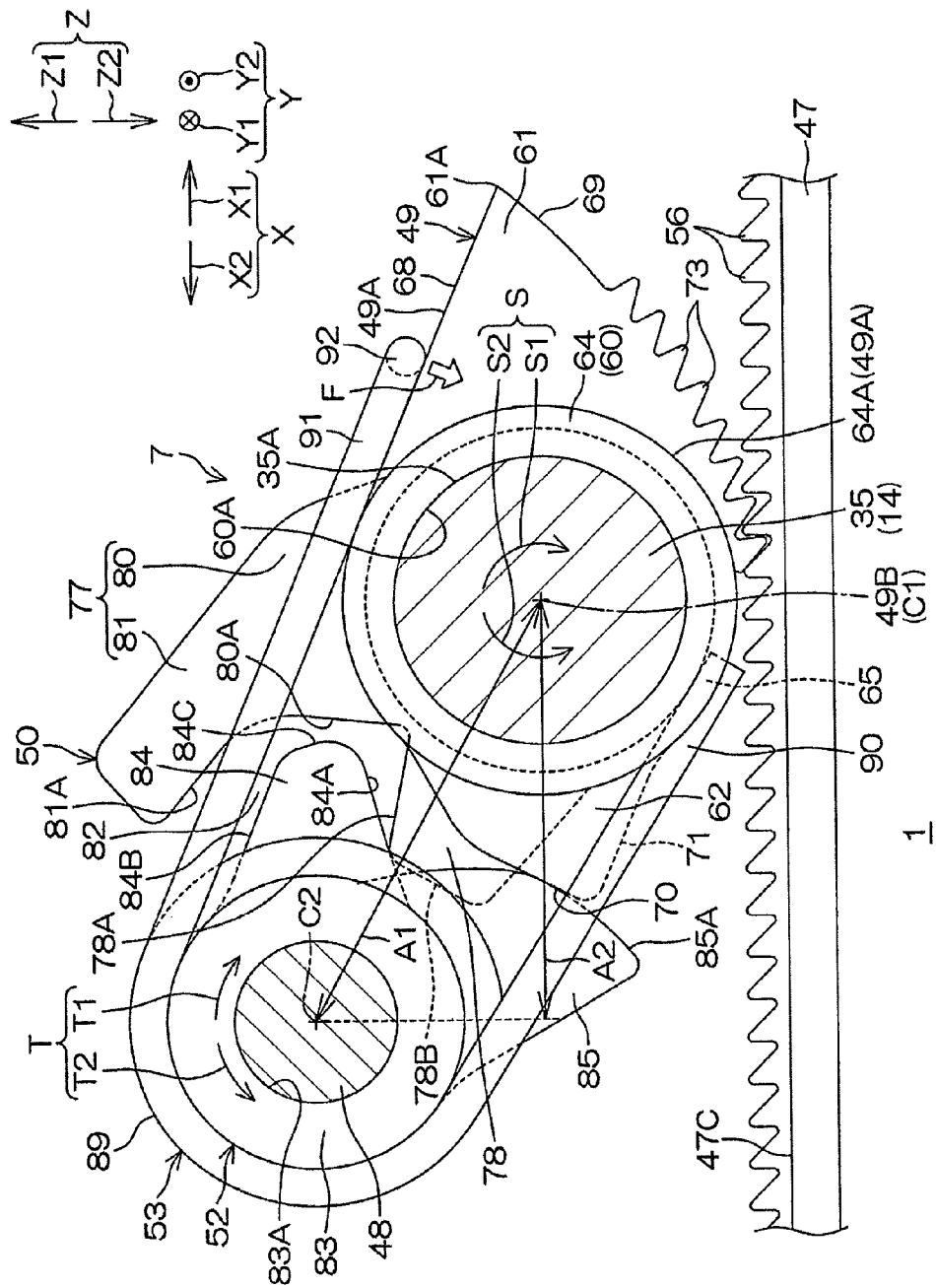
FIG. 8 is a sectional view of the lock mechanism and its surroundings at the time when a rotary shaft has been rotated clockwise from the state of FIG. 6.

With reference to FIG. 8, as the second projection 85 of the second rotary member 52 moves toward the rear side X1, the gap 93 becomes gradually smaller. In the course of time, the curved surface 85A of the second projection 85 abuts against the curved surface 70 of the second projecting portion 62 of the lock member 49.

From the state in which the curved surface 85A of the second rotary member 52 and the curved surface 70 of the lock member 49 abut against each other, the operation member 36 (see FIG. 6) is operated to further rotate the rotary shaft 35 toward the clockwise side S1. The second projection 85 of the second rotary member 52 starts moving the second projecting portion 62 of the lock member 49 toward the rear side X1 while causing the curved surface 85A to abut against the curved surface 70. Consequently, the lock member 49 starts rotating toward the counterclockwise side S2 to move from the meshing position.

In order to transfer rotation of the rotary shaft 35 to the lock member 49 via the first rotary member 50 and the second rotary member 52 in this way, it is necessary to make the amount of projection of the second protrusion 78 of the first rotary member 50, the amount of projection of the first projection 84 and the second projection 85 of the second rotary member 52, and the amount of projection of the second projecting portion 62 of the lock member 49 equal to or more than a predetermined value. To this end, it is necessary to make a clearance A1 between the center axis C1 of the rotary shaft 35, which supports the first rotary member 50 and the lock member 49, and the center axis C2 of the support shaft 48, which supports the second rotary member 52, equal to or more than a predetermined distance.

As discussed earlier, the support shaft 48 is disposed in a direction inclined in the axial direction X with respect to the rotary shaft 35. Therefore, a clearance A2 between the center axis C2 of the support shaft 48 and the center axis C1 of the rotary shaft 35 in the axial direction X can be reduced. The steering device 1 can be downsized in the axial direction X.

When the lock member 49 is rotated toward the counterclockwise side S2, the plurality of engaging teeth 73 of the lock member 49 is moved toward the counterclockwise side S2. When the lock member 49 is rotated toward the counterclockwise side S2, the coupling portion 92 of the urging member 53 is moved toward the upper side Z1 by the flat surface 68 of the first projecting portion 61 of the lock member 49. Consequently, the pair of deformable portions 91 of the urging member 53 is further elastically deformed toward the upper side Z1.

Figure 9:
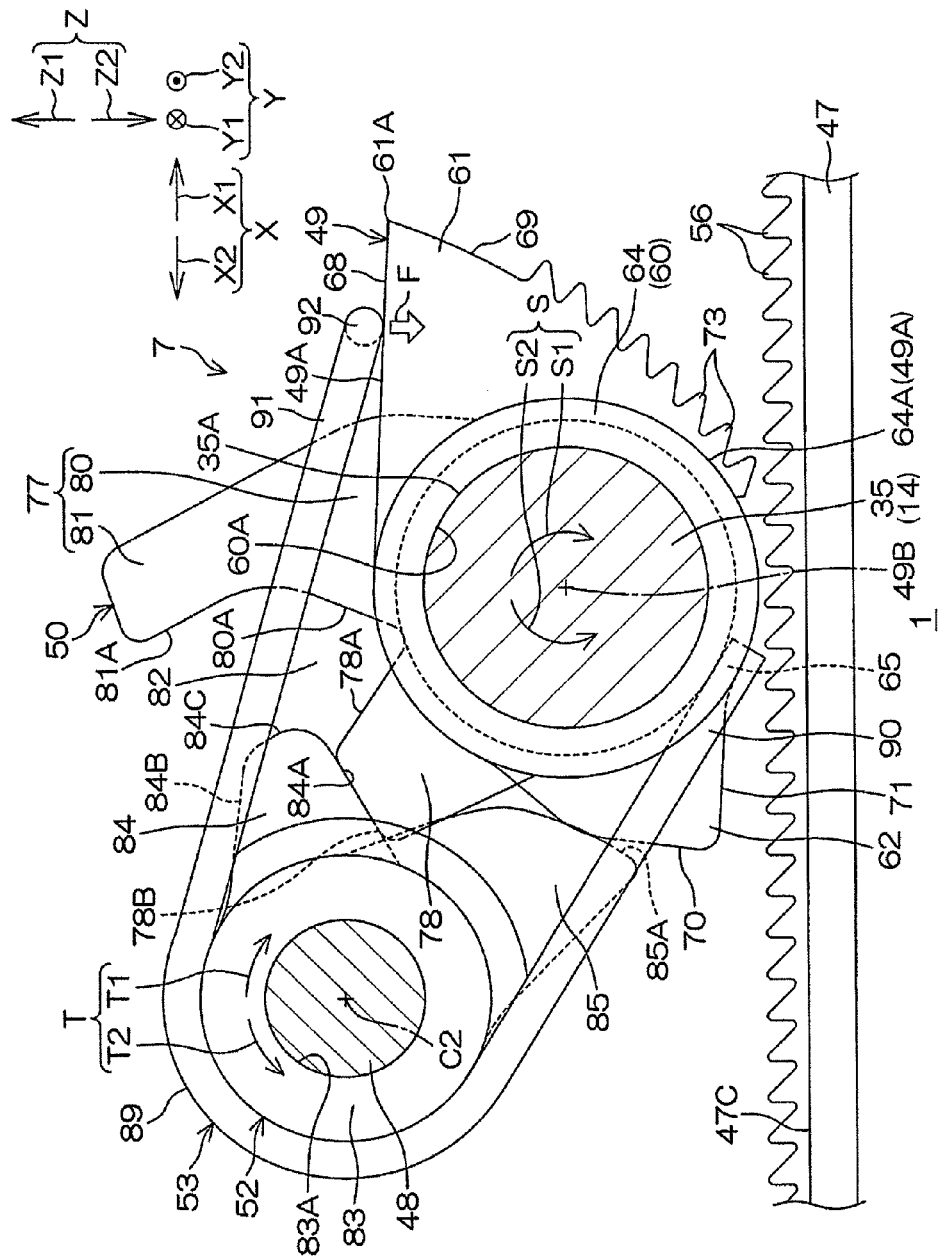
FIG. 9 is a sectional view of the lock mechanism and its surroundings at the time when the steering device 1 is in the unlocked state.
Figure 10:
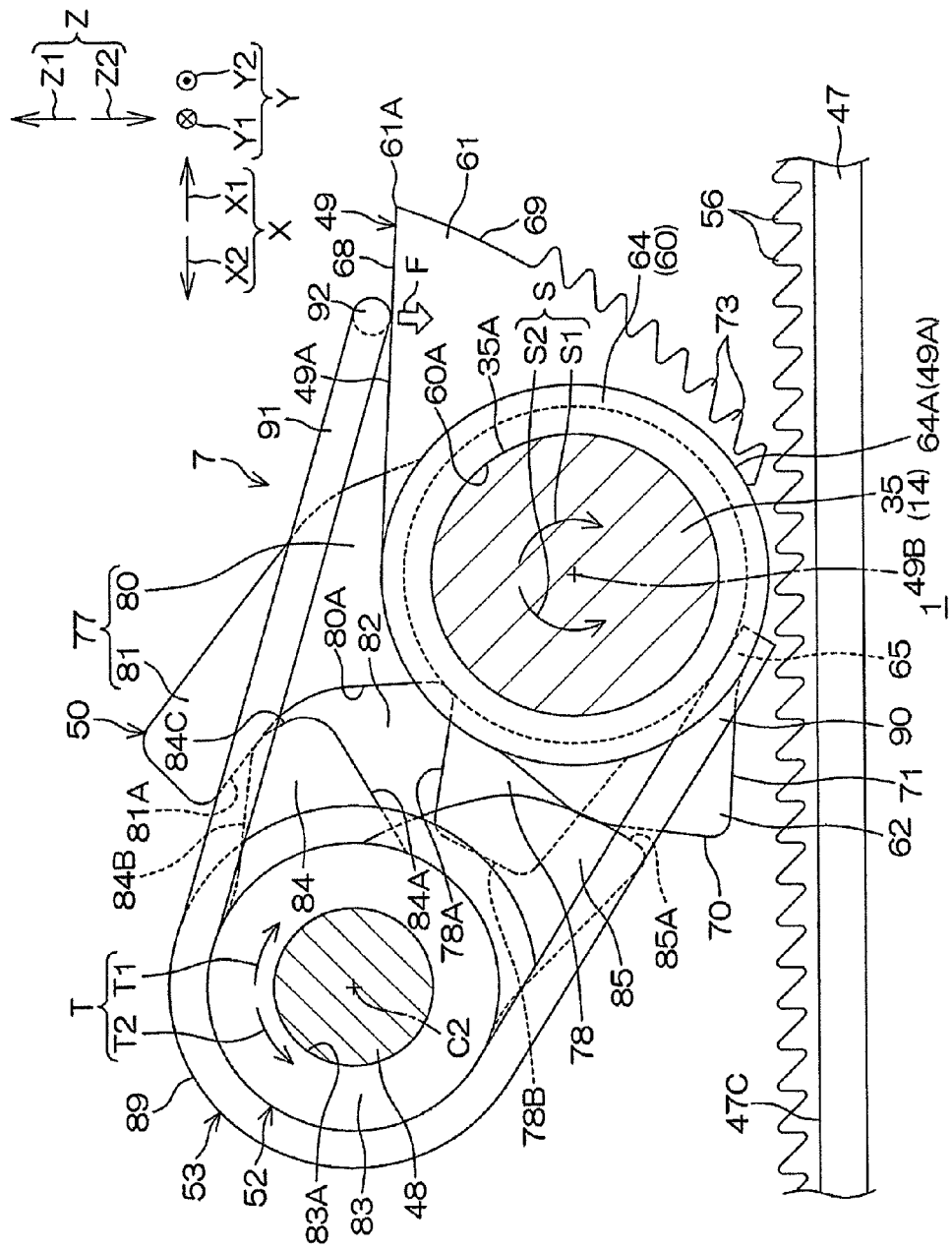
FIG. 10 is a sectional view of the lock mechanism 7 and its surroundings at the time when the rotary shaft has been rotated counterclockwise from the state of FIG. 9.

With reference to FIG. 9, when the operation member 36 (see FIG. 2) is rotated toward the clockwise side S1 to the extreme position from the state illustrated in FIG. 8, the steering device 1 reaches the unlocked state.

In the unlocked state, the lock member 49 is positioned at a position at which the lock member 49 has been rotated to the extreme position on the counterclockwise side S2. At this time, the plurality of engaging teeth 73 of the lock member 49 is spaced toward the upper side Z1 from the plurality of engaged teeth 56 of the lock plate 47. That is, meshing between the plurality of engaging teeth 73 and the plurality of engaged teeth 56 has been canceled. The position of the lock member 49 in the rotational direction S at this time is referred to as a "disengaged position". In this way, the lock member 49 is caused to abut against the second rotary member 52 to be moved from the meshing position to the disengaged position.

In this way, rotation of the rotary shaft 35 can be reliably transferred to the lock member 49 via the first rotary member 50 and the second rotary member 52 to rotate the lock member 49 from the meshing position to the disengaged position.

The rotational direction of the lock member 49 which moves from the meshing position to the disengaged position is toward the counterclockwise side S2, which is opposite to the clockwise side S1 toward which the rotary shaft 35 is rotated. In this way, rotation of the rotary shaft 35 is converted into rotation in the opposite direction by the second rotary member 52.

Hence, when the operation member 36 which is fixed to the rotary shaft 35 is operated to be turned toward the clockwise side S1, the lock member 49 is rotated toward the counterclockwise side S2. In this way, an operation of the operation member 36 can be transferred to the lock member 49 with the direction in which the operation member 36 is operated intentionally converted into the opposite direction.

When the lock member 49 is located at the disengaged position, the position of the upper jacket 17 to which the lock plate 47 is fixed in the axial direction X is not restricted by the lock member 49. Therefore, the upper jacket 17 is unlocked in position in the axial direction X, which enables telescopic adjustment of the steering member 8.

When the lock member 49 is located at the disengaged position, the first projection 84 of the second rotary member 52 has been separated away from the dent 82, and the surface 78B of the second protrusion 78 of the first rotary member 50 is in abutment with the surface 84A of the second rotary member 52 from the lower side Z2. In the unlocked state, the first protrusion 77 of the first rotary member 50 is positioned substantially on the upper side Z1 of the cylindrical portion 76 of the first rotary member 50. In the unlocked state, the curved surface 85A of the second projection 85 of the second rotary member 52 and the curved surface 70 of the second projecting portion 62 of the lock member 49 are kept in abutment with each other.

In the unlocked state as well, as in the locked state, the urging member 53 urges the lock member 49 from the upper side Z1. Therefore, the lock member 49 receives a load toward the clockwise side S1. In this way, the lock member 49 is urged toward the meshing position by the urging member 53 at all times.

When the operation member 36 (see FIG. 2) is turned toward the counterclockwise side S2 from the unlocked state, the rotary shaft 35 is rotated toward the counterclockwise side S2. As discussed earlier, the first rotary member 50 is rotated in synchronization with the rotary shaft 35, and thus the first rotary member 50 is rotated toward the counterclockwise side S2. Consequently, the surface 78B of the second protrusion 78 of the first rotary member 50 is moved away from the surface 84A of the first projection 84 of the second rotary member 52 toward the lower side Z2. When the rotary shaft 35 is further rotated toward the counterclockwise side S2, the surface 81A of the distal end portion 81 of the first protrusion 77 of the first rotary member 50 abuts against the surface 84B of the first projection 84.

When the rotary shaft 35 is further rotated toward the counterclockwise side S2, the first projection 84 of the second rotary member 52 is rotated toward the clockwise side T1 such that the surface 84B and the surface 84C slide on the surface 80A and the surface 81A of the first protrusion 77. When the operation member 36 (see FIG. 2) is operated to rotate the rotary shaft 35 toward the counterclockwise side S2 in this way, the second rotary member 52 is rotated toward the clockwise side T1 in the circumferential direction T about the support shaft 48 in conjunction with rotation of the first rotary member 50 toward the counterclockwise side S2.

As discussed earlier, the urging member 53 urges the lock member 49 from the upper side Z1 toward the meshing position. Therefore, when the rotary shaft 35 is rotated toward the counterclockwise side S2, the lock member 49 is urged by the urging member 53 toward the meshing position to be rotated toward the clockwise side S1. The curved surface 70 of the lock member 49 is rotated toward the clockwise side S1 while being kept in abutment with the curved surface 85A of the second rotary member 52.

Hence, the lock member 49 can be moved from the disengaged position to the meshing position even if the operation member 36 is not operated with a large operating force. On the other hand, although the urging member 53 urges the lock member 49, the lock member 49 is relatively rotatable with respect to the rotary shaft 35, and thus the urging force F of the urging member 53 does not directly act on the operation member 36. When the operation member 36 is operated to move the lock member 49 from the disengaged position to the meshing position, such an operation is not significantly affected by the urging force F of the urging member 53. Hence, the operating force for the operation member 36 for moving the lock member 49 between the disengaged position and the meshing position can be reduced.

From what has been described above, the steering device 1 can be downsized and an operating force for the operation member 36 can be reduced.

The rotational direction of the lock member 49 in moving from the disengaged position to the meshing position is toward the clockwise side S1, which is opposite to the counterclockwise side S2 toward which the rotary shaft 35 is rotated. Therefore, when the operation member 36 which is fixed to the rotary shaft 35 is turned toward the counterclockwise side S2, the lock member 49 is rotated toward the clockwise side S1

When the operation member 36 is turned toward the counterclockwise side S2 to the extreme position, the lock mechanism 7 is returned to the state of FIG. 6 by way of the state of FIG. 8 in which the lock member 49 is positioned at the meshing position. At this time, the state of the steering device 1 has reached the locked state again.

As has been described above, the lock member 49 is relatively rotatable with respect to the rotary shaft 35 between the meshing position and the disengaged position in accordance with an operation of the operation member 36.

As discussed earlier, the deformable portion 91 on the right side Y1 is in contact with the outer peripheral surface 76B of the cylindrical portion 76 of the first rotary member 50 from the direction Q of a normal to the outer peripheral surface 76B. In this case, the urging force F of the urging member 53 acts on the outer peripheral surface 76B of the cylindrical portion 76 of the first rotary member 50 from the normal direction Q, and thus the first rotary member 50 is hardly affected by the urging force F of the urging member 53 from the rotational direction S. Therefore, movement of the urging member 53 is not synchronous with movement of the rotary shaft 35 and the operation member 36. The operation member 36 which is fixed to the rotary shaft 35 can be operated while being hardly affected by the urging force F of the urging member 53. As a result, the operating force for the operation member 36 can be further reduced.

Half lock in which top surfaces of the engaging teeth 73 of the lock member 49 and the engaged teeth 56 of the lock plate 47 contact each other with the engaging teeth 73 and the engaged teeth 56 not meshing well with each other is occasionally caused in the middle of a transition from the unlocked state to the locked state. When the lock member is moved from the disengaged position to the meshing position, the urging member 53 rotates the lock member 49 toward the clockwise side S1, and the operating force for the operation member 36 is not transferred to the lock member 49. Even if the operation member 36 is operated during half lock, the engaging teeth 73 are not forcibly pressed against the engaged teeth 56. Thus, the operating force for the operation member 36 is not increased even if half lock is caused.

The lock mechanism 7 adopts a configuration (a so-called pull-lock configuration) in which when the operation member 36 is pulled toward the rear side X1 to turn the operation member 36 toward the counterclockwise side S2, the lock member 49 is moved toward the meshing position to lock the steering member 8 (see FIG. 1) in position. In the pull lock, when the operation member 36 is pushed toward the front side X2 to turn the operation member 36 toward the clockwise side S1, the lock member 49 is moved toward the disengaged position.

The first rotary member 50 can be positioned with the lock member 49 located at the meshing position by assembling the first rotary member 50 to the lock mechanism 7 so as to cause the first positioning surface 94A of the first rotary member 50 to abut against the second positioning surface 95A of the support portion 25 with the lock member 49 positioned at the meshing position. In this way, the first positioning surface 94A and the second positioning surface 95A compose a positioning mechanism 96 that positions the first rotary member 50 in the rotational direction S. Consequently, the first rotary member 50 is positioned easily. Therefore, the number of man-hours required to position the first rotary member 50 can be reduced.

Operation of the lock mechanism 7 at the time of a vehicle collision will be described.

With reference to FIG. 1, in a vehicle collision, a so-called secondary collision in which the driver collides against the steering member 8 is caused. When the steering device 1 is in the locked state, an impact of the secondary collision is transferred to the upper jacket 17 on the front side X2 via the steering member 8 and the upper shaft 15. When the secondary collision is caused, the lock plate 47 which is fixed to the upper jacket 17 is moved toward the front side X2 together with the upper jacket 17. The plurality of engaged teeth 56 which is provided on the lock plate 47 is also moved toward the front side X2.

With reference to FIG. 6, in the locked state, the lock member 49 is located at the meshing position, and therefore the engaged teeth 56 of the lock plate 47 and the engaging teeth 73 of the lock member 49 mesh with each other. When the plurality of engaged teeth 56 is moved toward the front side X2, the engaging teeth 73 are dragged by the engaged teeth 56 to be caught between the upper surface 47C of the lock plate 47 and the curved surface 69 of the lock member 49.

As discussed earlier, the gap 93 is provided between the curved surface 70 of the second projecting portion 62 of the lock member 49 and the curved surface 85A of the second projection 85 of the second rotary member 52. Therefore, the lock member 49 is rotated toward the clockwise side S1 while narrowing the gap 93. As discussed earlier, the distance D from the center of rotation 49B of the lock member 49 to the curved surface 69 of the first projecting portion 61 of the lock member 49 increases toward the rear side X1.

Figure 11:
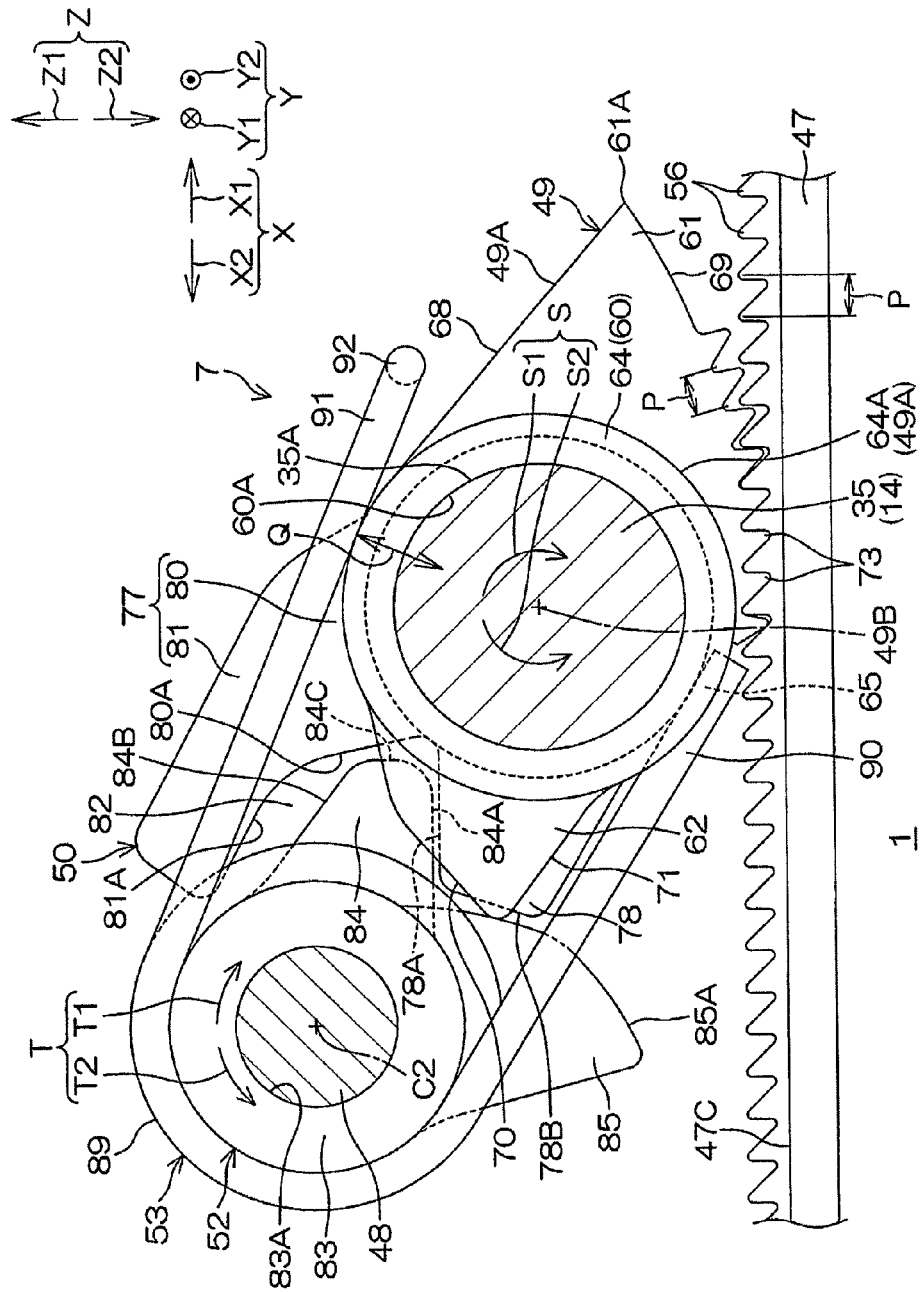
FIG. 11 illustrates the state of the lock mechanism of FIG. 6 after a vehicle collision.

Therefore, with reference to FIG. 11, when the lock member 49 is rotated toward the clockwise side S1 from the meshing position, the plurality of engaging teeth 73 of the curved surface 69 is brought closer to the plurality of engaged teeth 56 of the lock plate 47. Consequently, the number of engaging teeth 73 that mesh with the engaged teeth 56 is increased. This improves the performance of a lock due to meshing between the teeth, or so-called positive lock performance.

As a result, meshing between the engaging teeth 73 of the lock member 49 and the engaged teeth 56 of the lock plate 47 is strengthened. This prevents the upper jacket 17 from relatively moving with respect to the lower jacket 18 more than necessary at the time of a vehicle collision. The position of the lock member 49 in the rotational direction S at this time is referred to as a "locked position".

After the vehicle collision, with the lock member 49 moved to the locked position, relative movement of the upper jacket 17 with respect to the lower jacket 18 is restricted. After that, the pin 47B which penetrates the lock plate 47 and the upper jacket 17 in the up-down direction Z is sheared so that the upper jacket 17 is separated away toward the front side X2. When the upper jacket 17 is separated away toward the front side X2, the upper jacket 17 slides with respect to the lower jacket 18. Impact energy of the secondary collision is absorbed by the separation of the upper jacket 17 and sliding of the upper jacket 17 with respect to the lower jacket 18.

A desired energy absorption amount can be secured by adjusting the distance D from the center of rotation 49B of the lock member 49 to the curved surface 69 of the first projecting portion 61 of the lock member 49, the number of engaging teeth 73 of the lock member 49 that mesh with the engaged teeth 56 of the lock plate 47, and so forth.

A case where the half lock discussed earlier is caused in the locked state is assumed. In this case, when the upper jacket 17 is moved toward the front side X2 upon the secondary collision, the engaged teeth 56 slide toward the front side X2 by a slide amount corresponding to a pitch P of the plurality of engaging teeth 73 and the plurality of engaged teeth 56. After the engaged teeth 56 slide by an amount corresponding to the pitch P and the engaging teeth 73 and the engaged teeth 56 mesh with each other, the lock member 49 is moved from the meshing position to the locked position.

Thus, the amount of slide of the plurality of engaged teeth 56 can be adjusted by adjusting the pitch P of the plurality of engaging teeth 73 of the lock member 49 and the plurality of engaged teeth 56 of the lock plate 47.

When the lock member 49 is located at the locked position, the curved surface 85A of the second projection 85 of the second rotary member 52 and a coupling portion between the curved surface 70 and the flat surface 71 of the second projecting portion 62 of the lock member 49 are in abutment with each other. Therefore, rotation of the rotary shaft 35 can be transferred to the lock member 49 via the first rotary member 50 and the second rotary member 52 by operating the operation member 36 toward the clockwise side S1 to rotate the rotary shaft 35 toward the clockwise side S1 even with the lock member 49 located at the locked position. Particularly, the second rotary member 52, to which rotation toward the clockwise side S1 has been transferred from the rotary shaft 35, can be rotated toward the counterclockwise side T2 to rotate the lock member 49 toward the counterclockwise side S2 while causing the curved surface 85A to abut against the curved surface 70. When the lock member 49 is rotated toward the counterclockwise side S2, the lock member 49 is moved to the disengaged position through the meshing position while pushing the plurality of engaged teeth 56 of the lock plate 47 toward the rear side X1 with the plurality of engaging teeth 73.

In this way, the operation member 36 can be operated to move the lock member 49 to the disengaged position even in a state in which the plurality of engaging teeth 73 of the lock member 49 is caught between the upper surface 47C of the lock plate 47 and the curved surface 69 of the lock member 49.

As discussed earlier, the rotary shaft 35 is made of metal. Therefore, the rotary shaft 35 is not ruptured even in the case where an impact is transferred from the upper jacket 17 to the rotary shaft 35 via the lock member 49 during telescopic adjustment and at the time of a vehicle collision.

A first modification of the present invention will be described.

Members in FIG. 12 that are similar to the members described above are given identical reference numerals to omit description (the same applies to FIGS. 13 to 18 to be discussed later).

Figure 12:
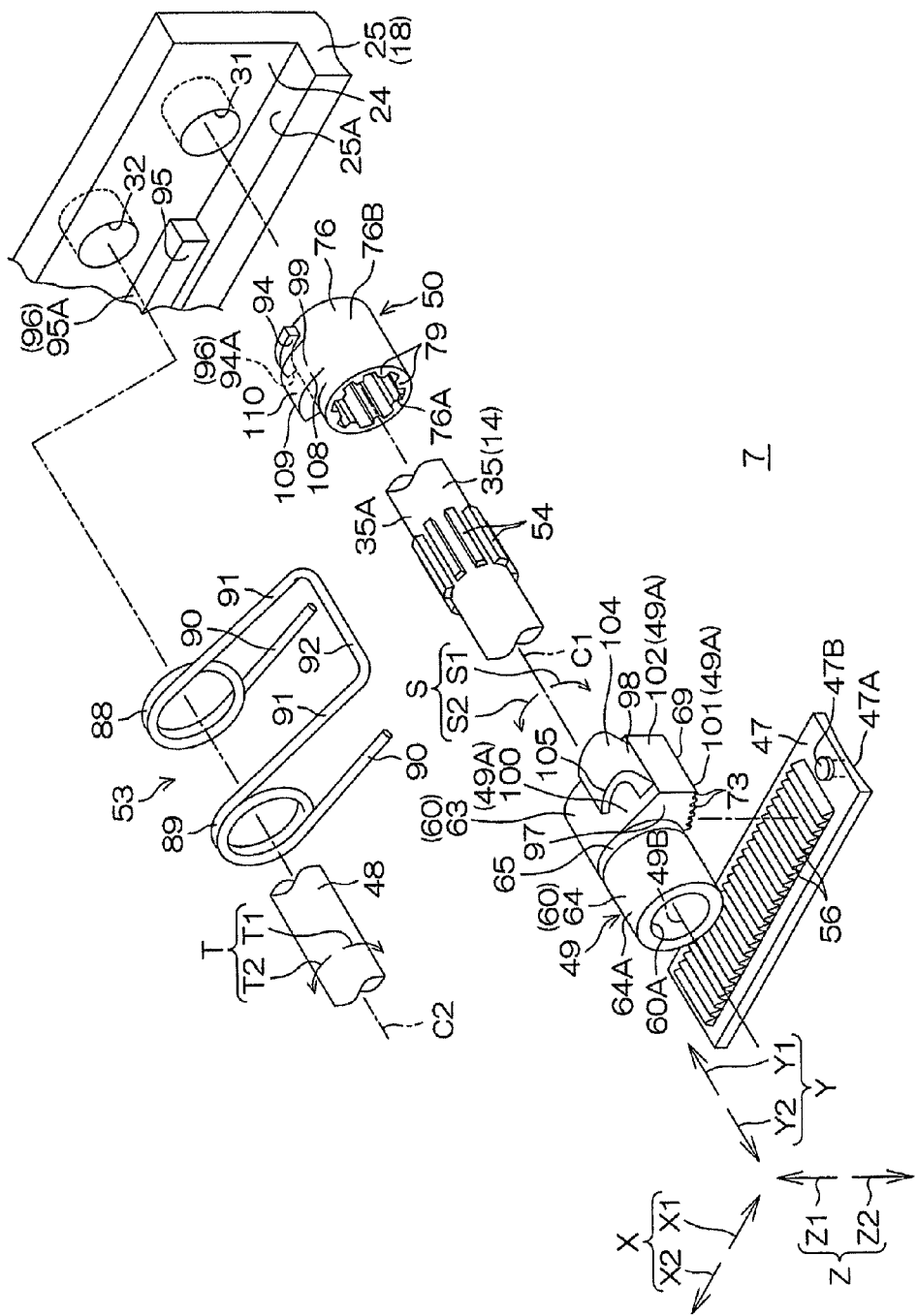
FIG. 12 illustrates application of a first modification of the present invention to FIG. 5.

With reference to FIGS. 5 and 12, unlike the steering device 1 according to the embodiment, the steering device 1 according to the first modification does not include the second rotary member 52. In addition, the lock member 49 according to the first modification includes a projecting portion 97 and an engagement portion 98 in place of the first projecting portion 61 and the second projecting portion 62. In addition, the first rotary member (rotary member) 50 according to the first modification includes a pressing portion 99 in place of the first protrusion 77 and the second protrusion 78.

Figure 13:
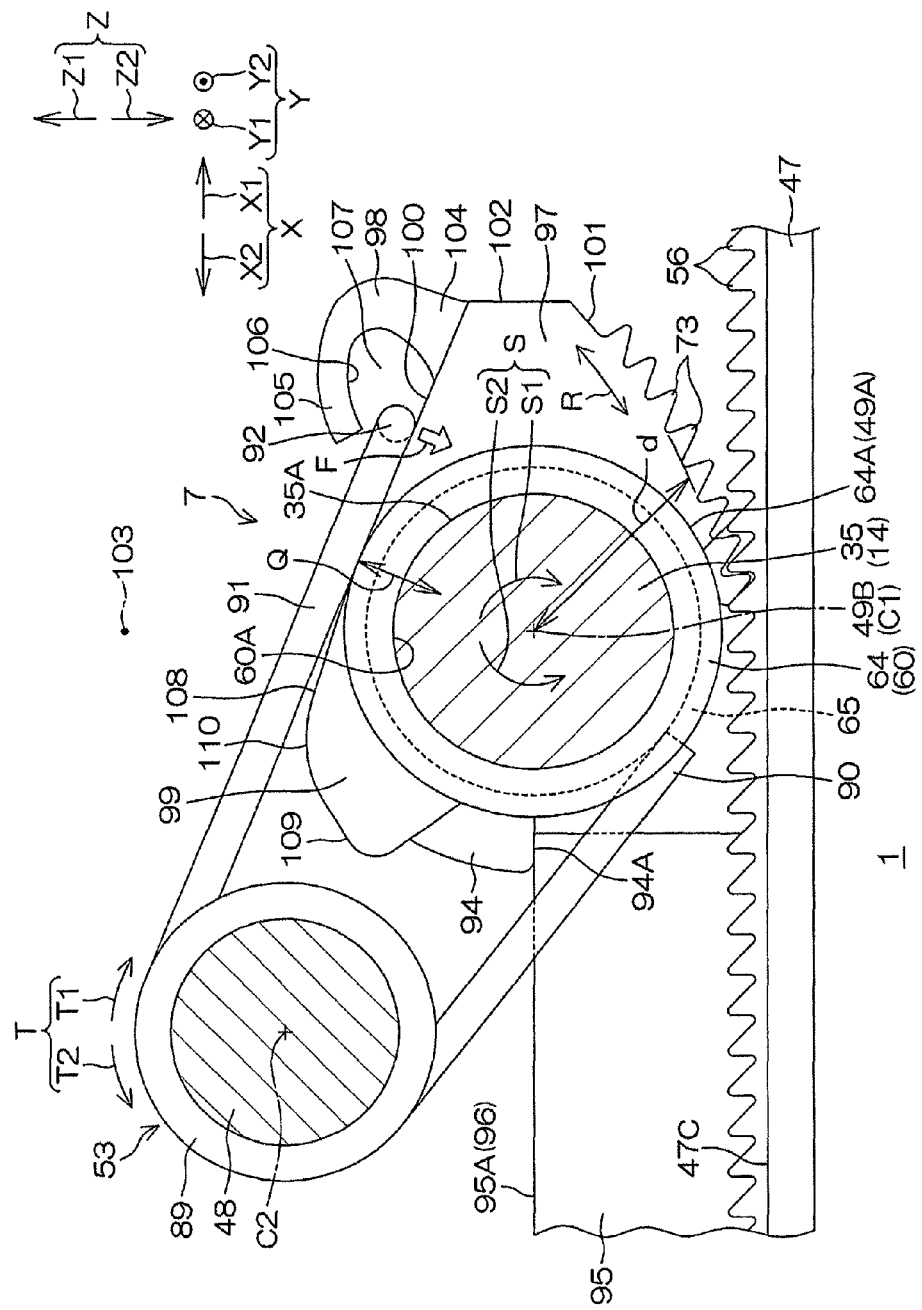
FIG. 13 illustrates application of the first modification to FIG. 6.

With reference to FIG. 13, the projecting portion 97 of the lock member 49 is obtained by cutting the rear end portion of the first projecting portion 61 according to the embodiment. Specifically, the projecting portion 97 has a generally trapezoidal shape that becomes thinner toward the rear side X1 as seen from the left side Y2.

The projecting portion 97 has a flat surface 100 on the upper side Z1, a curved surface 101 on the lower side Z2, and a coupling surface 102 on the rear side X1. The flat surface 100 is a surface of the projecting portion 97 on the counterclockwise side S2. The curved surface 101 is a surface of the projecting portion 97 on the clockwise side S1.

The flat surface 100 is a flat surface that extends along the direction of a tangent to the outer peripheral surface 64A of the second portion 64 of the cylindrical portion 60. The curved surface 101 is convexly curved toward the lower side Z2. The coupling surface 102 extends in the up-down direction Z, and couples between the rear end portion of the flat surface 100 and the rear end portion of the curved surface 101. The flat surface 100, the curved surface 101, and the coupling surface 102 are a part of the outer peripheral surface 49A of the lock member 49.

The position of a center of curvature 103 of the curved surface 101 of the lock member 49 in the axial direction X substantially coincides with the position of the center of rotation 49B of the lock member 49 in the axial direction X. The center of curvature 103 is located on the upper side Z1 with respect to the center of rotation 49B. That is, the center of curvature 103 is located at a position offset from the center of rotation 49B toward the upper side Z1. In addition, the radius of curvature of the curved surface 101 of the lock member 49 is larger than the radius of curvature of the outer peripheral surface 64A of the second portion 64 of the cylindrical portion 60 of the lock member 49. Therefore, a distance d from the center of rotation 49B to the curved surface 101 increases toward the rear side X1. As with the curved surface 69 according to the embodiment, the curved surface 101 is provided with the plurality of engaging teeth 73.

The engagement portion 98 has a base end portion 104 that extends from the rear end portion of the flat surface 100 of the projecting portion 97 toward the upper side Z1, and a distal end portion 105 that extends from the upper end portion of the base end portion 104 toward the front side X2 while being convexly curved toward the upper side Z1. A lower surface 106 of the distal end portion 105 generally faces the flat surface 100 in the up-down direction Z.

A space surrounded by the lower surface 106 of the distal end portion 105 of the engagement portion 98, a surface of the base end portion 104 on the front side X2, and the flat surface 100 of the projecting portion 97 of the lock member 49 is given a symbol 107. The space 107 is open toward the front side X2.

The pressing portion 99 of the first rotary member 50 projects from a portion of the cylindrical portion 76 on the left side Y2 toward the front side X2 and the upper side Z1. The pressing portion 99 has a generally trapezoidal shape that becomes thinner toward the front side X2 as seen in the right-left direction Y. The direction in which the pressing portion 99 projects also corresponds to the radially outer side of the cylindrical portion 76. In the following description, a surface of the pressing portion 99 on the rear side X1 and the upper side Z1 that forms a leg of the generally trapezoidal shape is referred to as a "pressing surface 108", and a surface of the pressing portion 99 on the front side X2 and the upper side Z1 that forms the upper base of the generally trapezoidal shape is referred to as a "support surface 109".

The pressing surface 108 is also a surface of the pressing portion 99 on the clockwise side S1. The support surface 109 is generally orthogonal to the radial direction of the cylindrical portion 76. The pressing surface 108 and the support surface 109 are smoothly coupled to each other by a bent surface 110 that is convexly curved toward the upper side Z1.

In the first modification, as discussed earlier, the second rotary member 52 (see FIG. 6) is not provided. Thus, the urging member 53 is supported by the lower jacket 18 via the support shaft 48. The pair of holding portions 90 and the pair of deformable portions 91 are directed toward the rotary shaft 35 (see FIG. 14). The first coil-shaped portion 88 and the second coil-shaped portion 89 are loosely wound around the outer peripheral surface of the support shaft 48. Consequently, the entire urging member 53 can be relatively rotated with respect to the support shaft 48.

The urging member 53 clamps the lock member 49 and the first rotary member 50 in the up-down direction Z between the pair of holding portions 90 and the pair of deformable portions 91 and the coupling portion 92.

Particularly, the rear end portion of the holding portion 90 of the urging member 53 on the left side Y2 is fitted into the groove 65 of the lock member 49 from the lower side Z2. The rear end portion of the holding portion 90 on the left side Y2 is in contact with a portion of the outer peripheral surface of the cylindrical portion 60 of the lock member 49 that defines the groove 65 from the lower side Z2. The rear end portion of the holding portion 90 on the right side Y1 is in contact with the outer peripheral surface 76B of the cylindrical portion 76 of the first rotary member 50 from the lower side Z2 (see FIG. 14).

When the steering device 1 is in the locked state, the lock member 49 is located at the meshing position. In this state, the rear end portion of the deformable portion 91 on the right side Y1 is in contact with the outer peripheral surface 76B of the cylindrical portion 76 of the first rotary member 50 from the direction Q of a normal to the outer peripheral surface 76B. A portion of the deformable portion 91 on the right side Y1 that is generally central in the axial direction X is not in contact with the pressing surface 108 of the pressing portion 99 of the first rotary member 50.

Figure 14:
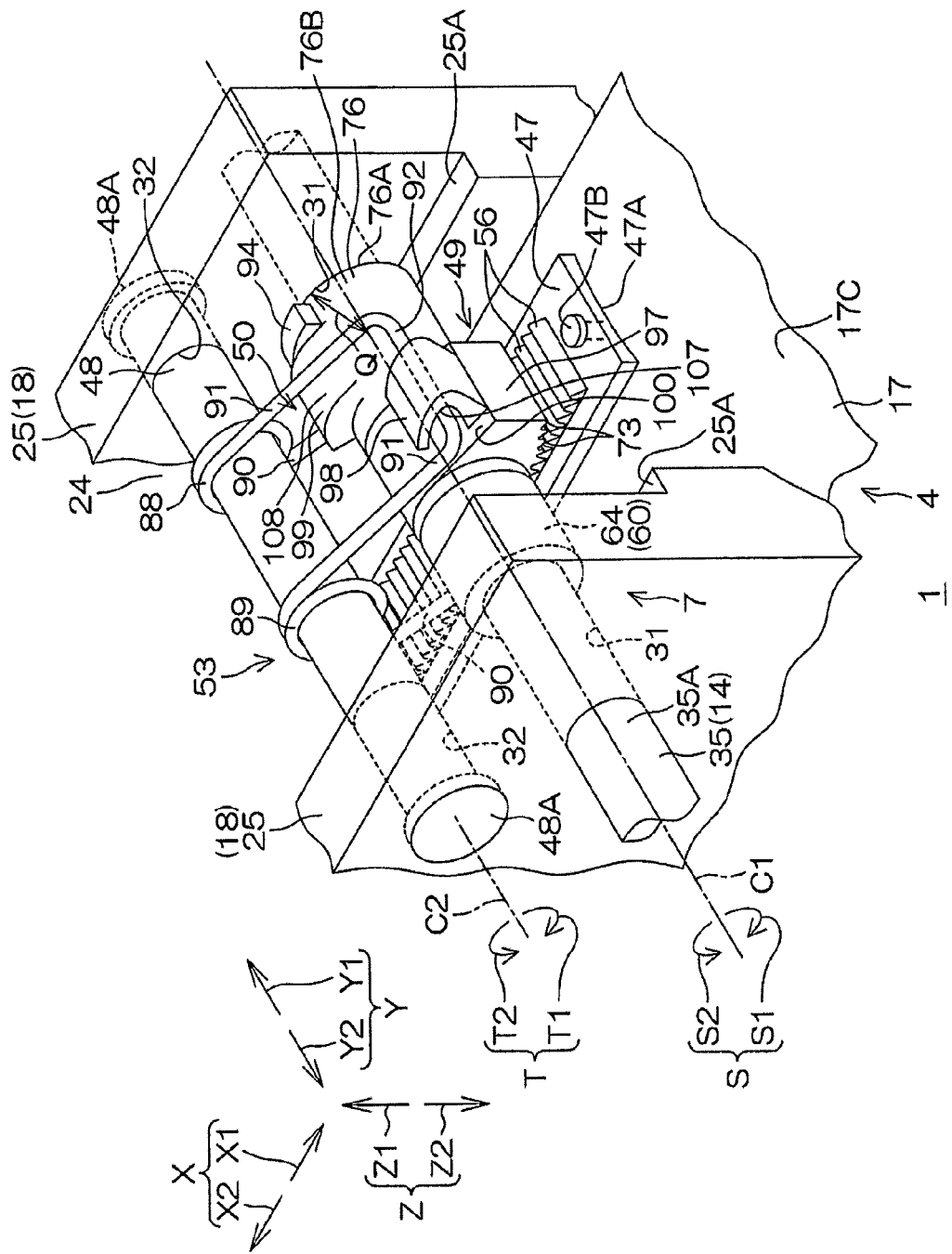
FIG. 14 illustrates application of the first modification to FIG. 3.

With reference to FIG. 14, in this state, the deformable portion 91 on the left side Y2 and a portion of the coupling portion 92 on the left side Y2 are in contact with the flat surface 100 of the projecting portion 97 of the lock member 49 form the upper side Z1. The flat surface 100 and the pair of deformable portions 91 are parallel to each other as seen in the right-left direction Y (see FIG. 13). A portion of the coupling portion 92 on the left side Y2 is positioned in the space 107. When the coupling portion 92 is positioned in the space 107, the urging member 53 is in engagement with the engagement portion 98 of the lock member 49. The urging member 53 is supported by the lower jacket 18 in engagement with the lock member 49.

Operation of the lock mechanism 7 at the time when the operation member 36 is rotated toward the clockwise side S1 from the locked state will be described in detail (see FIG. 2).

With reference to FIG. 13, in the steering device 1 in the locked state, when the operation member 36 (see FIG. 2) is rotated toward the clockwise side S1, the rotary shaft 35 is rotated toward the clockwise side S1. At this time, the first rotary member 50 which is rotatable in synchronization with the rotary shaft 35 is also rotated toward the clockwise side S1. The pressing portion 99 of the first rotary member 50 is moved toward the upper side Z1. Therefore, the pressing surface 108 of the pressing portion 99 of the first rotary member 50 contacts a portion of the deformable portion 91 on the right side Y1 that is generally central in the axial direction X from the lower side Z2. The pressing portion 99 of the first rotary member 50 starts pressing the portion of the deformable portion 91 of the urging member 53 on the right side Y1 that is generally central in the axial direction X toward the upper side Z1. Consequently, the pair of deformable portions 91 is elastically deformed toward the upper side Z1.

From the state in which the pressing portion 99 of the first rotary member 50 is in abutment with the portion of the deformable portion 91 of the urging member 53 on the right side Y1 that is generally central in the axial direction X, the operation member 36 (see FIG. 2) is operated to further rotate the rotary shaft 35 toward the clockwise side S1. The pair of deformable portions 91 is then further elastically deformed toward the upper side Z1. As the pair of deformable portions 91 is elastically deformed, the coupling portion 92 is moved toward the upper side Z1. The coupling portion 92 of the urging member 53 abuts against the lower surface 106 of the distal end portion 105 of the engagement portion 98 of the lock member 49 from the lower side Z2.

From the state in which the coupling portion 92 of the urging member 53 and the distal end portion 105 of the engagement portion 98 of the lock member 49 are in abutment with each other, the operation member 36 (see FIG. 2) is operated to further rotate the rotary shaft 35 toward the clockwise side S1. The pair of deformable portions 91 of the urging member 53 is then further elastically deformed toward the upper side Z1 by the pressing surface 108 of the pressing portion 99 of the first rotary member 50. The coupling portion 92 of the urging member 53 is moved toward the upper side Z1. Consequently, the urging member 53 starts moving the projecting portion 97 of the lock member 49 toward the upper side Z1 so as to lift the projecting portion 97 while causing a portion of the coupling portion 92 on the upper side Z1 to abut against the lower surface 106 of the distal end portion 105 of the engagement portion 98. Thus, the lock member 49 starts rotating toward the counterclockwise side S2 to move from the meshing position.

When the rotary shaft 35 is further rotated toward the clockwise side S1, the pressing portion 99 of the first rotary member 50 is rotated toward the clockwise side S1 such that the deformable portion 91 on the right side Y1 slides on the pressing surface 108, the bent surface 110, and the support surface 109 in this order.

Figure 15:
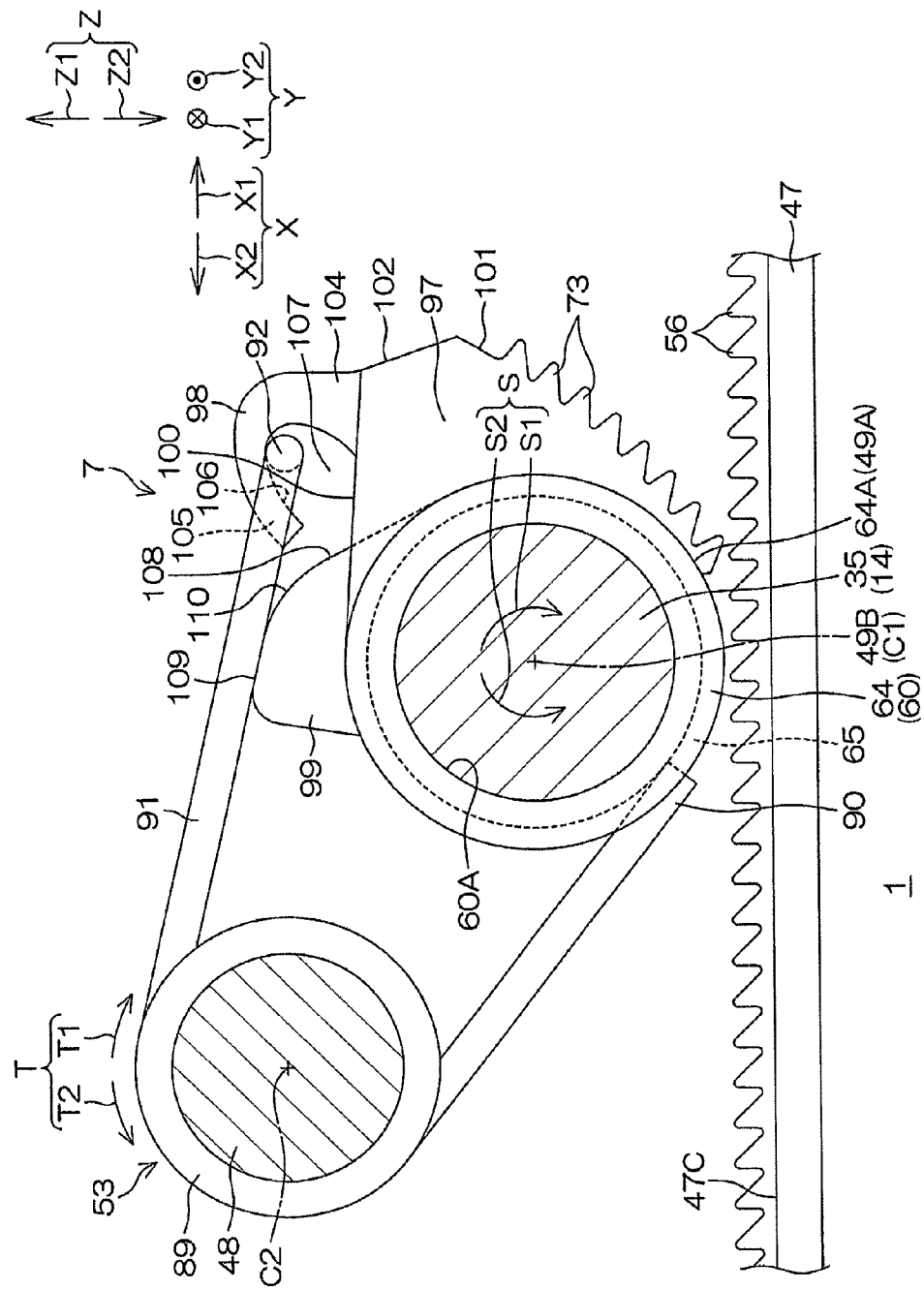
FIG. 15 illustrates application of the first modification to FIG. 9.

In FIG. 15, for convenience of description, the positioning mechanism 96 is not illustrated (the same applies to FIGS. 16 and 17 to be discussed later).

With reference to FIG. 15, when the operation member 36 (see FIG. 2) is rotated toward the clockwise side S1 to the extreme position from the state illustrated in FIG. 14, the steering device 1 reaches the unlocked state. When the steering device 1 is brought into the unlocked state, rotation of the first rotary member 50 toward the clockwise side S1 is stopped. In this state, the lock member 49 is positioned at the disengaged position.

While the lock member 49 is moved from the meshing position to the disengaged position, the coupling portion 92 of the urging member 53 is moved toward the upper side Z1, which is the direction from the meshing position to the disengaged position, in accordance with rotation of the first rotary member 50.

With the lock member 49 located at the disengaged position, the support surface 109 of the pressing portion 99 of the first rotary member 50 supports the deformable portion 91 on the right side Y1 from the lower side Z2. With the lock member 49 located at the disengaged position, the coupling portion 92 of the urging member 53 is continuously positioned in the space 107, and thus the urging member 53 is in engagement with the lock member 49. Particularly, the lock member 49 is maintained with a portion of the coupling portion 92 of the urging member 53 on the upper side Z1 in abutment with the lower surface 106 of the distal end portion 105 of the engagement portion 98. Therefore, the projecting portion 97 is maintained in a state of being lifted toward the upper side Z1.

With the lock member 49 located at the unlocked state, unlike the urging member 53 in the locked state, the urging member 53 does not urge the lock member 49.

The first rotary member 50 can reliably transfer rotation of the rotary shaft 35 to the lock member 49 via the urging member 53 to rotate the lock member 49 from the meshing position to the disengaged position.

The rotational direction of the lock member 49 which moves from the meshing position to the disengaged position is toward the counterclockwise side S2, which is opposite to the clockwise side S1 toward which the rotary shaft 35 is rotated. Rotation of the rotary shaft 35 is converted into rotation in the opposite direction by the urging member 53.

Hence, when the operation member 36 which is fixed to the rotary shaft 35 is operated to be turned toward the clockwise side S1, the lock member 49 is rotated toward the counterclockwise side S2. In this way, an operation of the operation member 36 can be transferred to the lock member 49 with the direction in which the operation member 36 is operated intentionally converted into the opposite direction.

When the operation member 36 (see FIG. 2) is turned toward the counterclockwise side S2 from the unlocked state, the rotary shaft 35 is rotated toward the counterclockwise side S2. The first rotary member 50 is rotated in synchronization with the rotary shaft 35, and thus the first rotary member 50 is rotated toward the counterclockwise side S2. Therefore, the pressing portion 99 of the first rotary member 50 is rotated toward the counterclockwise side S2 such that the deformable portion 91 (see FIG. 14) on the right side Y1 slides on the support surface 109, the bent surface 110, and the pressing surface 108 in this order.

As discussed earlier, the pair of deformable portions 91 of the urging member 53 has been elastically deformed toward the upper side Z1. The deformable portion 91 (see FIG. 14) on the right side Y1 sequentially slides on the support surface 109, the bent surface 110, and the pressing surface 108 to move toward the lower side Z2 while returning to the shape before the deformation. Accordingly, the coupling portion 92 of the urging member 53 is gradually moved toward the lower side Z2.

As the coupling portion 92 is gradually moved toward the lower side Z2, the projecting portion 97 which has been lifted toward the upper side Z1 by the coupling portion 92 is gradually moved toward the lower side Z2 while maintaining a state in which the lower surface 106 of the distal end portion 105 of the engagement portion 98 and the coupling portion 92 are in abutment with each other.

When the deformable portion 91 on the right side Y1 is no longer pressed by the pressing portion 99, the urging member 53 is released from the pressing portion 99, and the coupling portion 92 is in abutment with the flat surface 100 of the lock member 49. In this state, the coupling portion 92 is positioned in the space 107, and thus the urging member 53 is in engagement with the lock member 49.

With the lock member 49 in engagement with the urging member 53, the flat surface 100 of the lock member 49 is pressed toward the lower side Z2 by the coupling portion 92 of the urging member 53. The lock member 49 is urged toward the meshing position in engagement with the urging member 53.

Therefore, when the operation member 36 is turned toward the counterclockwise side S2 to the extreme position, the lock mechanism 7 is returned to the state of FIG. 13 in which the lock member 49 is positioned at the meshing position. At this time, the state of the steering device 1 has reached the locked state again.

The lock member 49 is urged toward the meshing position by the urging member 53 in this way. Therefore, the lock member 49 can be moved from the disengaged position to the meshing position even if the operation member 36 is not operated with a large operating force. The operating force for the operation member 36 for moving the lock member 49 between the disengaged position and the meshing position can be reduced.

The first rotary member 50 can move the urging member 53 to transfer rotation of the first rotary member 50 to the lock member 49 so as to move the lock member 49 from the meshing position to the disengaged position. In this case, it is not necessary to provide a separate component other than the urging member 53 in order to transfer rotation of the first rotary member 50 to the lock member 49. Thus, the number of components can be reduced. As long as the structure in which the urging member 53 is supported by the lower jacket 18 is adopted, the position and the method for supporting the urging member 53 may be freely selected.

The rotational direction of the lock member 49 in moving from the disengaged position to the meshing position is toward the clockwise side S1, which is opposite to the counterclockwise side S2 toward which the rotary shaft 35 is rotated. Therefore, when the operation member 36 which is fixed to the rotary shaft 35 is turned toward the counterclockwise side S2, the lock member 49 is rotated toward the clockwise side S1

In the steering device 1 according to the first modification, unlike the steering device 1 according to the embodiment, it is not necessary to provide the second rotary member 52. Therefore, the number of components can be reduced also compared to the steering device 1 according to the embodiment. Further, it is not necessary to take the clearance A1 (see FIG. 6) between the support shaft 48 and the rotary shaft 35 into consideration. Therefore, the degree of freedom in arrangement of the rotary shaft 35 and the urging member 53 can be improved.

As discussed earlier, with reference to FIG. 8, in the embodiment, the second rotary member 52 can be rotated toward the counterclockwise side T2 to rotate the lock member 49 toward the counterclockwise side S2 while causing the curved surface 85A to abut against the curved surface 70 of the lock member 49. Therefore, it is assumed that the operability of the operation member 36 may be reduced and the lock member 49 may not reach the disengaged position with the curved surface 70 being caught and unable to smoothly slide on the curved surface 85A depending on the manner of abutment between the curved surface 85A and the curved surface 70.

On the other hand, with reference to FIG. 13, in the first modification, the lock member 49 is not moved to the disengaged position with surfaces such as the curved surface 85A and the curved surface 70 (see FIG. 8) sliding on each other. Therefore, the operability of the operation member 36 in bringing the lock member 49 from the meshing position to the disengaged position is improved, and the lock member 49 can be reliably moved to the disengaged position.

Half lock in which top surfaces of the engaging teeth 73 of the lock member 49 and the engaged teeth 56 of the lock plate 47 contact each other with the engaging teeth 73 and the engaged teeth 56 not meshing well with each other is occasionally caused in the middle of a transition from the unlocked state to the locked state. When the lock member is moved from the disengaged position to the meshing position, the urging member 53 rotates the lock member 49 toward the clockwise side S1, and the operating force for the operation member 36 is not transferred to the lock member 49. Thus, even if the operation member 36 is operated during half lock, the engaging teeth 73 are not forcibly pressed against the engaged teeth 56. Thus, the operating force for the operation member 36 is not increased even if half lock is caused.

Operation of the lock mechanism 7 at the time of a vehicle collision will be described.

With reference to FIG. 14, in the first modification, as in the embodiment, when the secondary collision is caused, the lock plate 47 which is fixed to the upper jacket 17 is moved toward the front side X2 together with the upper jacket 17. The plurality of engaged teeth 56 which is provided on the lock plate 47 is also moved toward the front side X2.

Figure 16:
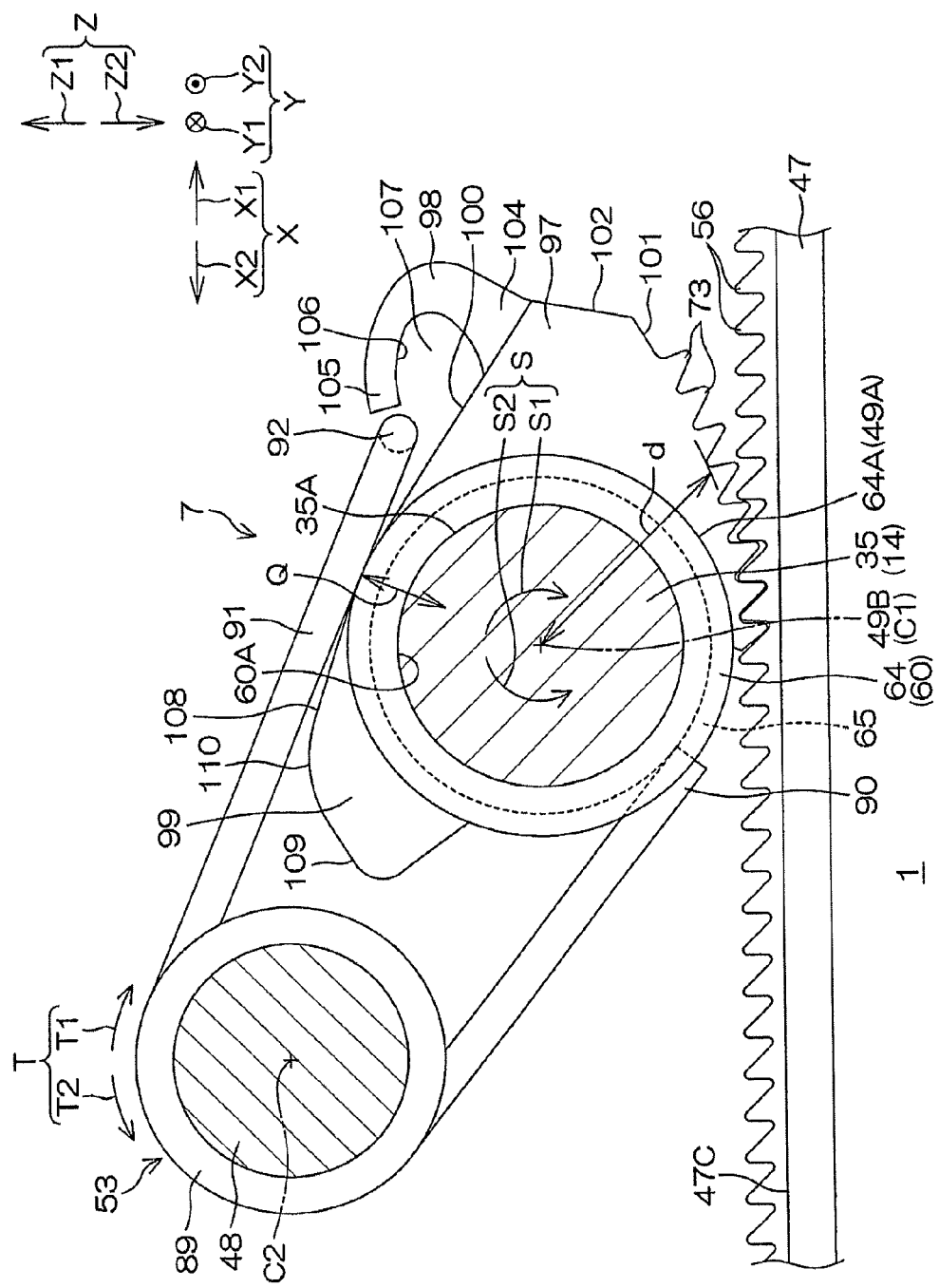
FIG. 16 illustrates application of the first modification to FIG. 11.

With reference to FIG. 16, in the locked state, the lock member 49 is located at the meshing position, and therefore the engaged teeth 56 of the lock plate 47 and the engaging teeth 73 of the lock member 49 mesh with each other. Therefore, when the plurality of engaged teeth 56 is moved toward the front side X2 in a secondary collision, the engaging teeth 73 are dragged by the engaged teeth 56 to be caught between the upper surface 47C of the lock plate 47 and the curved surface 101 of the lock member 49.

As discussed earlier, the distance d from the center of rotation 49B of the lock member 49 to the curved surface 101 of the projecting portion 97 of the lock member 49 increases toward the rear side X1. Therefore, when the lock member 49 is rotated toward the clockwise side S1 from the meshing position, the plurality of engaging teeth 73 of the curved surface 69 is brought closer to the plurality of engaged teeth 56 of the lock plate 47. The number of engaging teeth 73 that mesh with the engaged teeth 56 is increased. Therefore, the positive lock performance is improved.

Next, a second modification of the present invention will be described.

Figure 17:
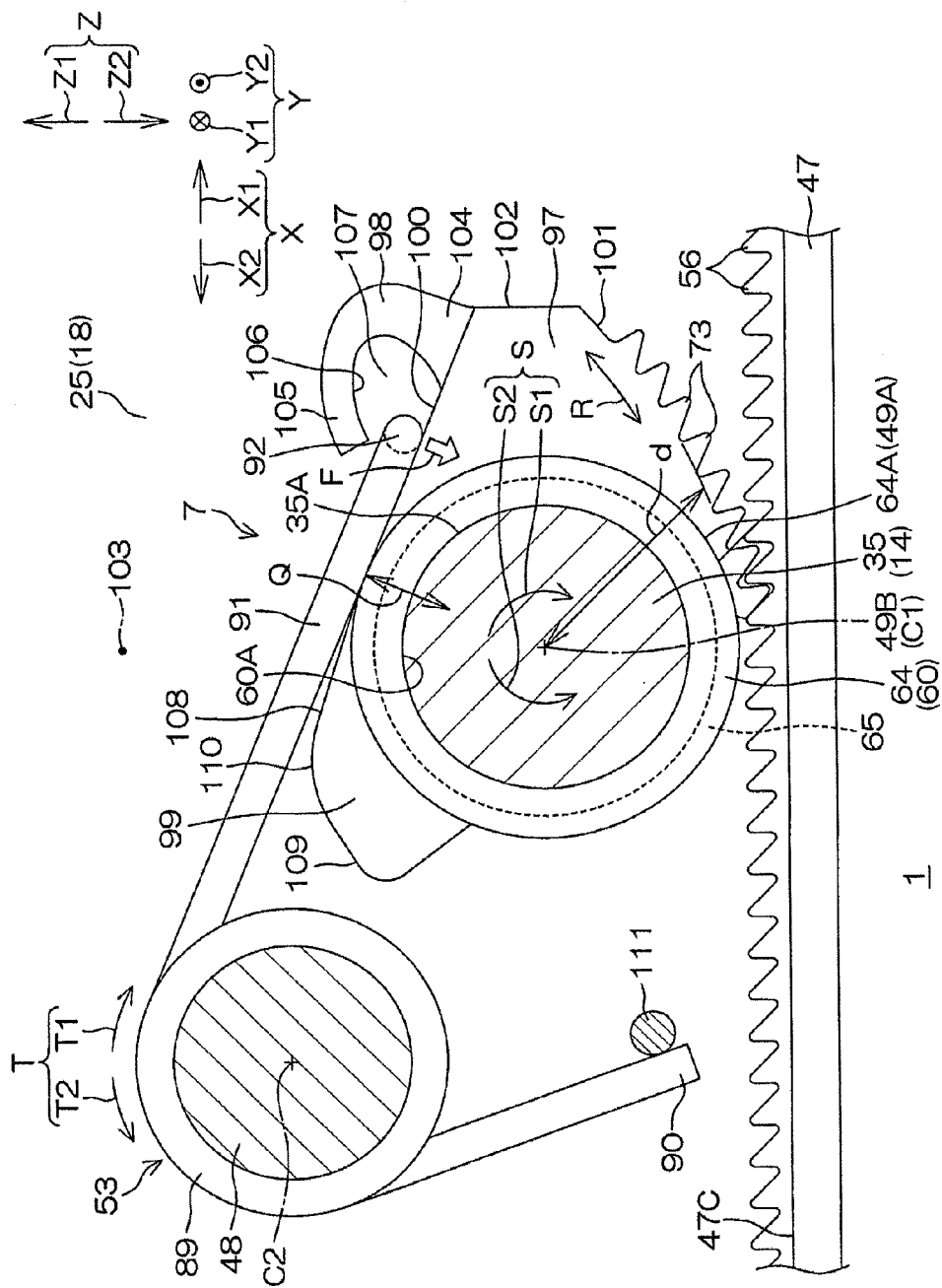
FIG. 17 illustrates application of a second modification of the present invention to FIG. 6.

With reference to FIG. 17, the steering device 1 according to the second modification is different from the steering device 1 according to the first modification in that the support portions 25 of the lower jacket 18 include a pair of catching portions 111. The catching portions 111 each have the shape of a bar that extends in the right-left direction Y, for example. The catching portions 111 are integrally provided to the respective support portions 25, for example. The catching portion 111 on the right side Y1 extends from a surface on the left side Y2 of the support portion 25 on the right side Y1 toward the left side Y2. The catching portion 111 on the left side Y2 extends from a surface on the right side Y1 of the support portion 25 on the left side Y2 toward the right side Y1.

The catching portions 111 overlap each other as seen in the right-left direction Y. The pair of catching portions 111 is positioned on the lower side Z2 of the support shaft 48 and on the upper side Z1 of the lock plate 47. The rear end portions of the holding portions 90 of the urging member 53 contact the catching portions 111 from the lower side Z2 and the front side X2 to be caught. In this way, the urging member 53 can be reliably held with the holding portions 90 caught by the catching portions 111 which are integral with the lower jacket 18.

A third modification of the present invention will be described.

Figure 18:
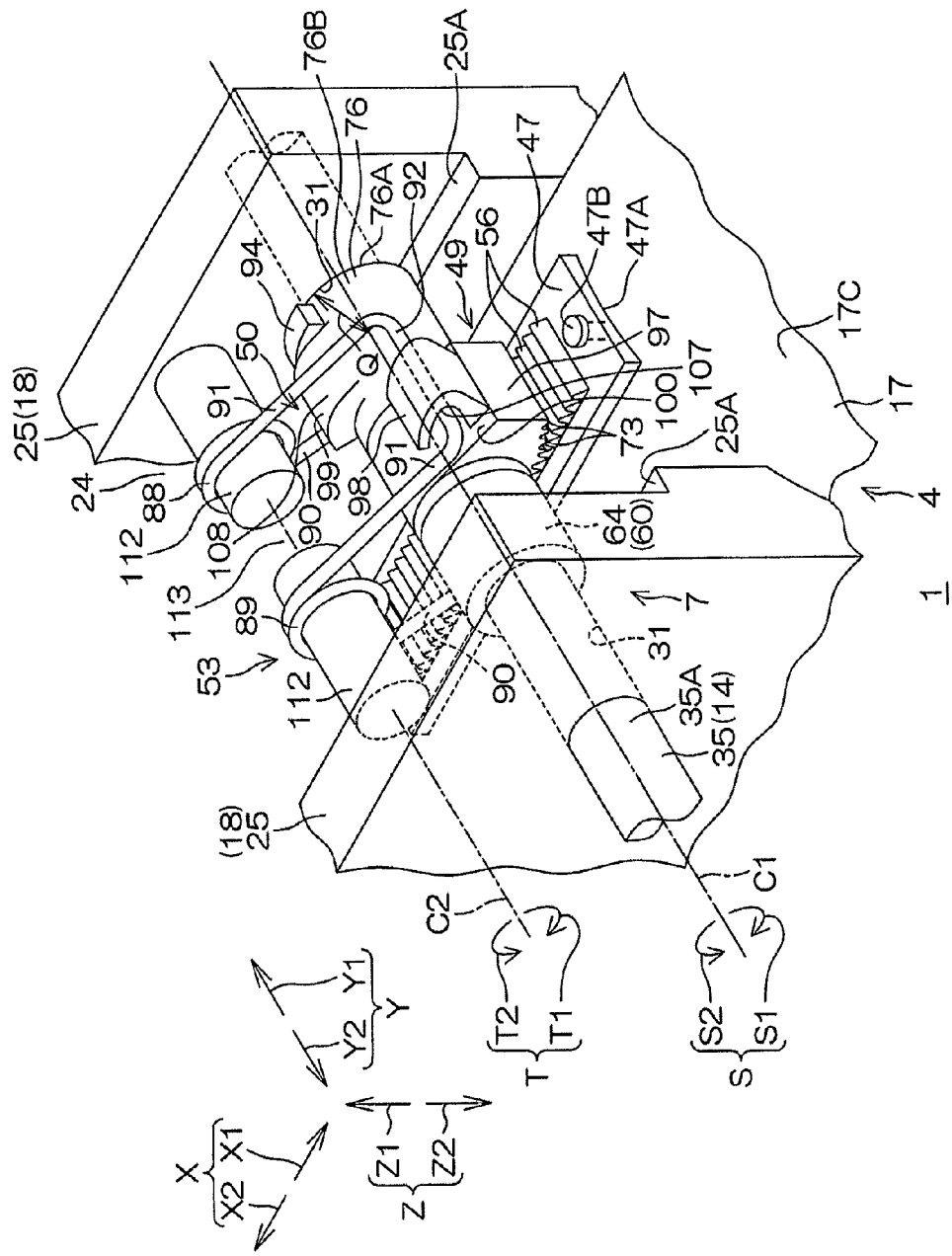
FIG. 18 illustrates application of a third modification of the present invention to FIG. 3.

With reference to FIG. 18, unlike the steering device 1 according to the first modification, the steering device 1 according to the third modification does not include the support shaft 48. The steering device 1 according to the third modification includes a pair of protrusions 112 in place of the support shaft 48. The protrusions 112 are provided integrally with the respective support portions 25. The protrusions 112 each have the shape of a column that extends in parallel with the rotary shaft 35, that is, in the right-left direction Y. The protrusions 112 overlap each other as seen in the right-left direction Y. A gap 113 is provided between the protrusions 112 in the right-left direction Y.

The protrusions 112 are positioned on the front side X2 and the upper side Z1 with respect to the first through holes 31 of the support portions 25. The protrusions 112 are fixed to the support portions 25 of the lower jacket 18 at a position farther away from the plurality of engaged teeth 56 of the lock plate 47 toward the upper side Z1 than the rotary shaft 35, and therefore disposed in a direction inclined in the axial direction X with respect to the rotary shaft 35.

The first coil-shaped portion 88 of the urging member 53 is attached to the protrusion 112 on the right side Y1 from the left side Y2. The second coil-shaped portion 89 of the urging member 53 is attached to the protrusion 112 on the left side Y2 from the right side Y1.

In this way, the number of components can be further reduced by providing the protrusions 112 integrally with the support portions 25.

The present invention is not limited to the embodiment described above, and may be modified in various ways.

For example, the steering device 1 is a steering device of a so-called upper lever type in which the base end portion 36A of the operation member 36 is disposed on the upper side Z1 with respect to the upper jacket 17. However, the lock mechanism 7 may also be applied to a steering device of a so-called lower lever type in which the base end portion 36A of the operation member 36 is disposed on the lower side Z2 with respect to the upper jacket 17.

In this case, the entire lock mechanism 7 is disposed on the lower side Z2 of the upper jacket 17. In the locked state, the members of the lock mechanism 7 are in a positional relationship obtained by inverting FIG. 6, 13, 17, or 18 upside down to compose the lock mechanism 7. Therefore, the lock mechanism 7 has a so-called push-lock configuration in which when the operation member 36 is pushed toward the front side X2 to turn the operation member 36 toward the clockwise side S1, the lock member 49 is moved toward the meshing position to lock the steering member 8 in position. In the push lock, when the operation member 36 is pulled toward the rear side X1 to turn the operation member 36 toward the counterclockwise side S2, the lock member 49 is moved toward the disengaged position.

In addition, the positioning mechanism 96 may be used to position the first rotary member 50 when the lock member 49 is located at the disengaged position. In this case, it is necessary to provide protrusions (not illustrated) that project inward in the right-left direction Y from the respective support portions 25, and that face a surface of the positioning portion 94 of the first rotary member 50 on the clockwise side S1 in the rotational direction S in place of the stepped portion 95 discussed earlier.

In addition, the component that fixes the lock plate 47 to the upper jacket 17 is not limited to the pin 47B. That is, any component may be used that fixes the lock plate 47 to the upper jacket 17 at normal times and that enables the lock plate 47 to be separated away from the upper jacket 17 for relative movement therebetween upon a secondary collision.

For example, the lock plate 47 may be fixed to the upper jacket 17 via an energy absorption member. The configuration allows the lock plate 47, the energy absorption member, and the upper jacket 17 to move integrally with each other at normal times, and allows the energy absorption member to be deformed to enable movement of the upper jacket 17 with respect to the lock plate 47 upon a secondary collision.

In addition, the steering device 1 is not limited to a steering device of a manual type in which assistance for steering of the steering member 8 is not provided, and may be an electric power steering device of a column assist type in which assistance for steering of the steering member 8 is provided by an electric motor.

What is claimed is:

1. A steering device comprising:
    a steering member;
    a steering shaft which is expandable and contractible in an axial direction and to one end of which the steering member is coupled;
    a column jacket including an upper jacket adjacent to the steering member and a lower jacket on the opposite side of the upper jacket from the steering member, the column jacket being expandable and contractible in the axial direction together with the steering shaft through movement of the upper jacket with respect to the lower jacket in the axial direction;
    a bracket fixed to a vehicle body to support the lower jacket;
    a rotary shaft supported by the bracket to extend in a direction that is orthogonal to the axial direction, the rotary shaft being configured to rotate in accordance with an operation of an operation member attached to one end of the rotary shaft;
    a plurality of engaged teeth fixed to the upper jacket, the engaged teeth being arranged side by side in the axial direction;
    a lock member supported by the rotary shaft and having an outer peripheral surface formed with an engaging tooth that meshes with the engaged teeth in order to lock the upper jacket in position in the axial direction, the lock member being relatively rotatable with respect to the rotary shaft between a meshing position at which the engaging tooth and the engaged teeth mesh with each other and a disengaged position at which meshing between the engaging tooth and the engaged teeth is canceled;
    a support shaft provided separately from the rotary shaft to extend in parallel with the rotary shaft, the support shaft being supported by the lower jacket at a position farther away from the engaged teeth than the rotary shaft;
    a first rotary member supported by the rotary shaft so as to rotate in synchronization with the rotary shaft;
    a second rotary member supported by the support shaft and configured to rotate about the support shaft in conjunction with rotation of the first rotary member to abut against the lock member to move the lock member to the disengaged position; and
    an urging member supported by the second rotary member to urge the lock member toward the meshing position,
    wherein the first rotary member has a cylindrical surface that extends along a circumferential direction of an outer peripheral surface of the rotary shaft; and
    the urging member contacts the cylindrical surface from a direction of a normal to the cylindrical surface.

2. The steering device according to claim 1, wherein a rotational direction of the lock member is opposite to a rotational direction of the rotary shaft.

3. The steering device according to claim 1, wherein:
    the outer peripheral surface of the lock member is provided with a plurality of the engaging teeth formed along a surface direction of the outer peripheral surface, and a distance between a center of rotation of the lock member and a portion of the outer peripheral surface at which the engaging teeth are provided increases at a location farther away from the engaged teeth;
    a gap is provided between the second rotary member and the lock member with the lock member located at the meshing position; and
    the lock member is moved while narrowing the gap so as to increase the number of the engaging teeth that mesh with the engaged teeth that move toward the opposite side together with the upper jacket when a vehicle collision is caused.

4. The steering device according to claim 1, wherein:
    the second rotary member includes a first projection and a second projection disposed away from each other in a direction in which the support shaft extends to project toward the rotary shaft;
    the first rotary member includes a protrusion that projects toward the support shaft and that can abut against the first projection; and
    the lock member includes a projecting portion that projects toward the support shaft and that can abut against the second projection.

5. The steering device according to claim 1, further comprising:
    a positioning mechanism provided to the lower jacket to position the first rotary member when the lock member is located at the meshing position or the disengaged position.

6. A steering device comprising:
    a steering member;
    a steering shaft which is expandable and contractible in an axial direction and to one end of which the steering member is coupled;
    a column jacket including an upper jacket adjacent to the steering member and a lower jacket on the opposite side of the upper jacket from the steering member, the column jacket being expandable and contractible in the axial direction together with the steering shaft through movement of the upper jacket with respect to the lower jacket in the axial direction;

a bracket fixed to a vehicle body to support the lower jacket;

a rotary shaft supported by the bracket to extend in a direction that is orthogonal to the axial direction, the rotary shaft being configured to rotate in accordance with an operation of an operation member attached to one end of the rotary shaft;

a plurality of engaged teeth fixed to the upper jacket, the engaged teeth being arranged side by side in the axial direction;

a lock member supported by the rotary shaft and having an outer peripheral surface formed with an engaging tooth that meshes with the engaged teeth in order to lock the upper jacket in position in the axial direction, the lock member being relatively rotatable with respect to the rotary shaft between a meshing position at which the engaging tooth and the engaged teeth mesh with each other and a disengaged position at which meshing between the engaging tooth and the engaged teeth is canceled;

an urging member supported by the lower jacket in engagement with the lock member to urge the lock member toward the meshing position; and a rotary member supported by the rotary shaft so as to rotate in synchronization with the rotary shaft to move the urging member in a direction from the meshing position toward the disengaged position in accordance with rotation of the rotary shaft, wherein a rotational direction of the lock member is opposite to a rotational direction of the rotary shaft, the rotary member includes a pressing portion that projects from the rotary member to press the urging member;

the lock member includes an engagement portion that engages with the urging member, the lock member being different from the rotary member; and the rotary member, the urging member and the lock member are structured such that: when the rotary member rotates in a first direction, (i) the urging member is moved by the pressing portion of the rotary member, and (ii) the engagement portion of the lock member is pushed by the movement of the urging member toward a second direction which is opposite to the first direction.

7. The steering device according to claim 6, further comprising:

a positioning mechanism provided to the lower jacket to position the rotary member when the lock member is located at the meshing position or the disengaged position.

* * * * *